United States Patent

Moe

[15] 3,646,262

[45] Feb. 29, 1972

[54] ELECTRONIC REPRODUCTION OF CONTINUOUS IMAGE WITH CONTROLLED MODIFICATION OF IMAGE REPRODUCTION

[72] Inventor: William West Moe, Stratford, Conn.

[73] Assignee: Printing Developments, Inc., New York, N.Y.

[22] Filed: Mar. 25, 1968

[21] Appl. No.: 723,642

Related U.S. Application Data

[63] Continuation-in-part of Ser. No. 625,038, Mar. 22, 1967, abandoned.

[52] U.S. Cl. ..........178/6.7 R, 178/6.6 B

[51] Int. Cl. ..........H04n 5/84

[58] Field of Search ..........178/6.7 R, 6.6 B, 7.6, 7.1, 178/6.8, DIG. 25, 5.4 F; 346/74 P, 74 ES; 250/220, 237; 179/100.3 C

[56] References Cited

UNITED STATES PATENTS

| | | | |
|---|---|---|---|
| 2,205,528 | 6/1940 | Hasbrouck, Jr. | 179/100.3 C |
| 3,043,906 | 7/1962 | Hassing | 178/6.6 B |
| 3,128,337 | 4/1964 | Levine | 178/6.6 B |
| 3,374,311 | 3/1968 | Hell | 178/6.6 B |
| 3,461,229 | 8/1969 | Oppenheimer | 178/6.7 |
| 2,818,465 | 12/1957 | Brink | 178/6.7 |
| 2,892,887 | 6/1959 | Hell | 178/6.6 B |
| 3,197,558 | 7/1965 | Ernst | 178/6.6 B |
| 1,954,969 | 4/1934 | Wallace | 178/7.1 E |
| 2,678,389 | 5/1954 | Loughlin | 328/164 |
| 2,778,971 | 1/1957 | Sunstein | 178/5.4 F |
| 2,960,562 | 11/1960 | Macouski | 178/5.4 SD |
| 2,962,548 | 11/1960 | Taudt | 178/6.6 B |
| 3,264,889 | 8/1966 | Machida et al. | 178/6.6 B |

*Primary Examiner*—Robert L. Griffin
*Assistant Examiner*—Donald E. Stout
*Attorney*—Brumbaugh, Graves, Donohue & Raymond

[57] ABSTRACT

A tonal subject and a bar pattern are synchronously scanned to produce image and dot interval signals later combined to form a dot signal modulating by a light valve the width of a light beam synchronously scanning photosensitive film to expose a halftone image of the subject. Tone edges on the subject cause a shifting of the beam center transverse of the scanning direction to sharpen such edges as reproduced. Type matter and picture matter may be respectively reproduced in full tone and half tone by appropriate manual or mask control of the scaling factor of the image signal.

36 Claims, 59 Drawing Figures

INVENTOR.
WILLIAM WEST MOE
BY Brumbaugh, Free, Graves & Donohue
his ATTORNEYS

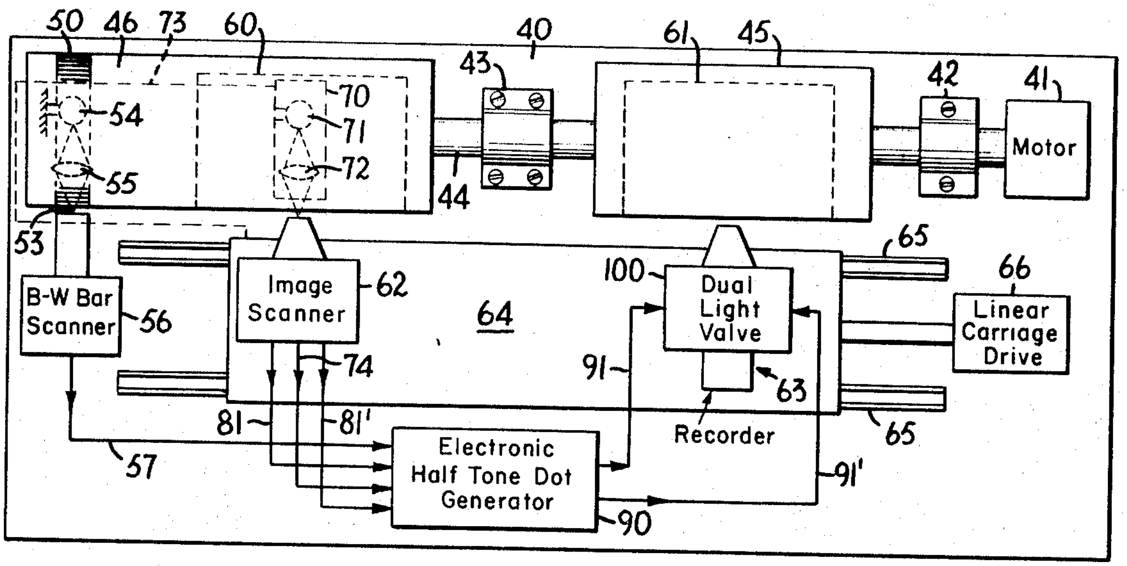
FIG. 2
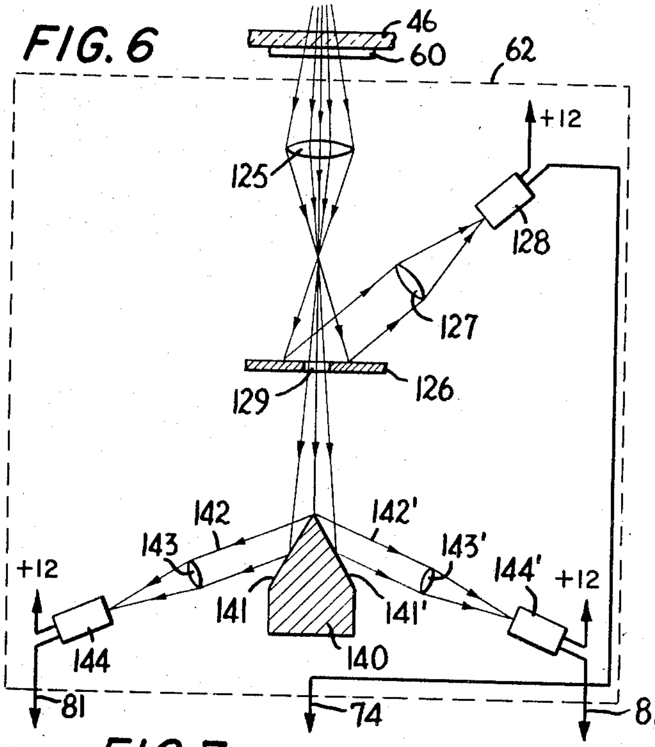
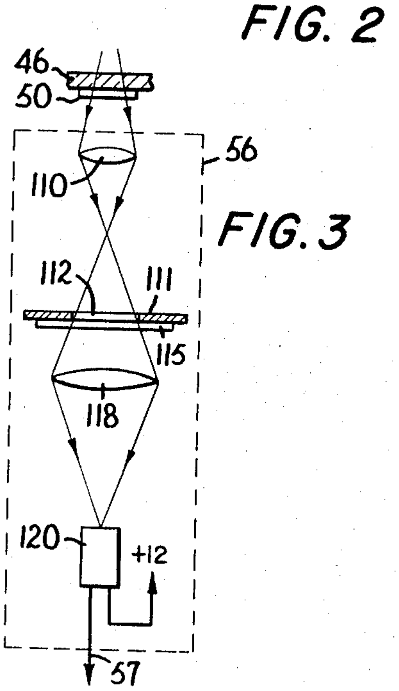
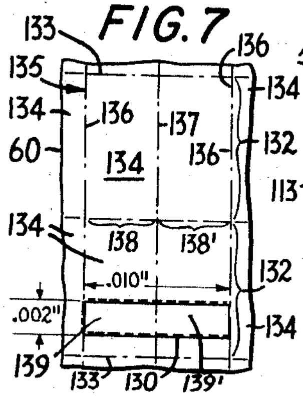
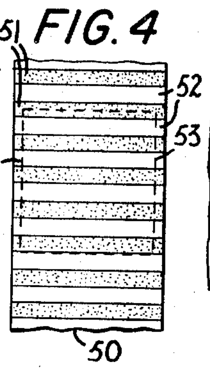
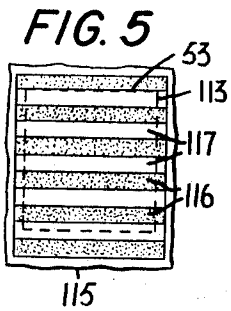
INVENTOR.
WILLIAM WEST MOE
BY Brumbaugh, Free, Graves & Donohue
his ATTORNEYS INVENTOR.
WILLIAM WEST MOE
BY Brumbaugh, Free, Graves & Donohue
his ATTORNEYS INVENTOR.
WILLIAM WEST MOE
BY Brumbaugh, Free, Graves & Donohue
his ATTORNEYS

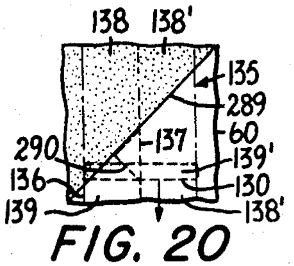
FIG. 20
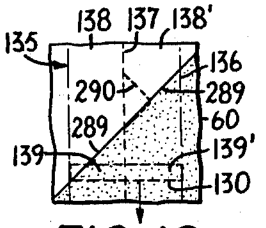
FIG. 18
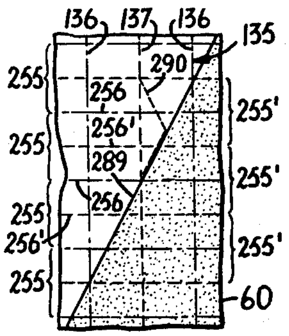
FIG. 22a
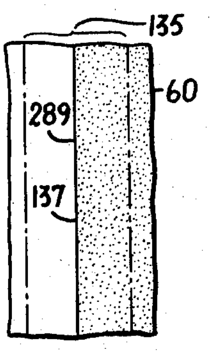
FIG. 22b
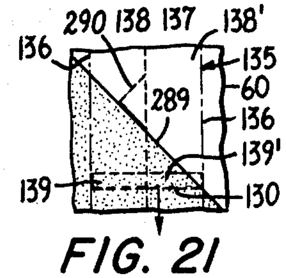
FIG. 21
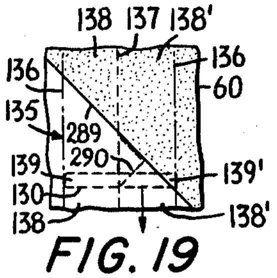
FIG. 19
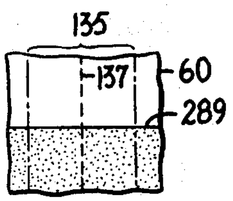
FIG. 22c
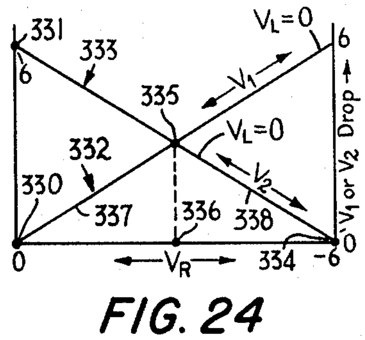
FIG. 24
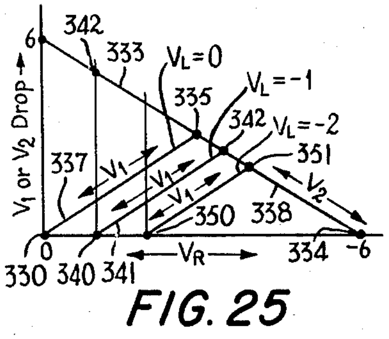
FIG. 25
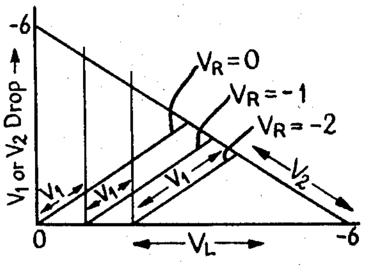
FIG. 26
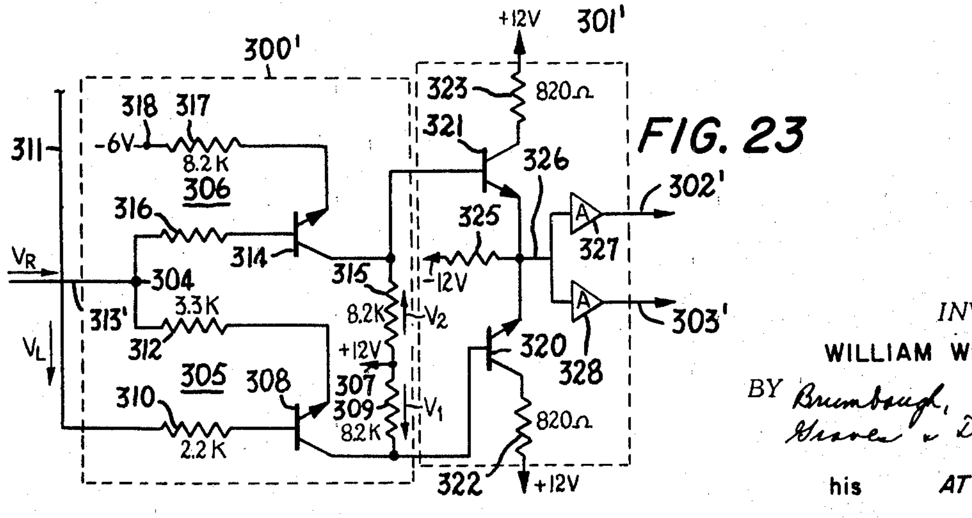
INVENTOR.
WILLIAM WEST MOE
BY Brumbaugh, Free, Graves & Donohue
his ATTORNEYS

INVENTOR.
WILLIAM WEST MOE

BY Brumbaugh, Free, Graves & Donohue his ATTORNEYS

INVENTOR.
WILLIAM WEST MOE

BY Brumbaugh, Free, Graves & Donohue his ATTORNEYS

INVENTOR.
WILLIAM WEST MOE
BY Brumbaugh, Free, Graves & Donohue his ATTORNEYS

INVENTOR.
WILLIAM WEST MOE
BY Brumbaugh, Free, Graves & Donohue
his ATTORNEYS

INVENTOR.
WILLIAM WEST MOE
BY Brumbaugh, Free, Graves & Donohue
his ATTORNEYS

ELECTRONIC REPRODUCTION OF CONTINUOUS IMAGE WITH CONTROLLED MODIFICATION OF IMAGE REPRODUCTION

This invention is a continuation-in-part of my application Ser. No. 625,038, filed Mar. 22, 1967 which is now abandoned.

The invention relates to methods and means for converting an original continuous image into a halftone image or into, selectively, a full image and/or a halftone image. More particularly, this invention relates to methods and means of such sort which are electrical in character.

In order to ink-print on paper the images provided by photographs, drawings or other copy, the original continuous image must be converted for example, into a halftone image on a single printing plate (in the case of black and white printing) or into halftone images on a plurality of color plates (in the case of color printing). As is well known, an inked halftone printing plate reproduces the image by forming relatively small ink dots and relatively large ink dots on areas of the paper intended to reproduce, respectively, a lighter tone and a darker tone.

Heretofore, an original continuous image has been conventionally converted into a halftone image by photographic methods wherein a halftone screen is placed between the original image and a photosensitive film, and the original image is then projected as a light image through the screen onto the film to be exposed thereon as a halftone image. Those photographic methods are however, disadvantageous in that they result in ragged tone density edges in the halftone image. Moreover, in the instance where electronic image reproduction forms at least part of the process of converting a continuous original image into a halftone image, the necessity for switching from electronic to photographic techniques in order to produce half tone is a factor which adds to the cost and complexity of the process.

Proposals have been made for photoengraving machines wherein a continuous image is reproduced in half tone on a metal plate by actuating an engraving stylus to cut half tone dots in the plate. Also, it has been proposed in U.S. Pat. 1,683,934 to Ives and in U.S. Pat. 2,818,465 issued Dec. 31, 1957 in the name of R. M. Brink to produce by electronic means a half tone image on photographic film. Such proposals are, however, incapable of providing many of the features of the present invention.

Objects among others of this invention are:

(a) to improve the reproduction of an original image by effecting a shift of reproduced image portions away from their normal positional correlation with informationally corresponding original image portions, (b) to convert an original image into an electric signal halftone image, (c) to smoothen the reproduction by dot methods of image details in the form of edges or gradients between contrasting image areas, (d) to control the reproduction of an image so as to selectively effect either halftone or full-tone reproduction, and (e) to provide for real-tone or delayed-tone remote reproduction of an image by scanning techniques supplemented or unsupplemented by photocomposing techniques.

These and other objects are realized according to the invention in one of its aspects by scanning an original continuous image to derive therefrom an image signal, and by concurrently generating a signal of a character to graduate the image signal into dot intervals. From those two signals, there is derived a resultant signal for actuating a recording means which scans an image-receptive member. The recording means is controlled by the resultant signal to record on the member a plurality of dots which together form on the member a reproduction of the original continuous image.

As an additional aspect of the invention, means may be provided to vary the size or shape of the dots formed on the member. As another aspect of the invention, means may be provided to vary from nominal standard positions the locations of the centers of area of the dots formed on the member.

For a better understanding of the aforementioned and other aspects of the invention, reference is made to the following description of representative embodiments thereof and to the accompanying drawings wherein:

FIG. 2 is a schematic diagram of a halftone dot-generating system which exemplifies the present invention;

FIG. 3 is a schematic diagram of the black-white bar scanner of FIG. 2, and FIGS. 4 and 5 are enlarged views of such scanner;

FIG. 6 is a schematic diagram of the image scanner of FIG. 2, and FIG. 7 is an enlarged view of a detail of such scanner;

FIGS. 18–21 are diagrams of various types of tone density edges, and FIGS. 22a–22c are diagrams of modifications of the FIG. 18 edge;

FIGS. 23 and 24–26 are, respectively a schematic diagram of the offcenter deflection circuits of FIG. 8, and the mode of operation of such circuits;

FIGS. 39a–41a show masks usable with the copies of FIGS. 39–41;

In the description which follows, counterpart elements are designated by the same reference number but are differentiated from each other by the use of prime (') or letter suffixes for one or more of the same reference numbers. Unless the context otherwise requires, a description of any element having one or more counterparts is to be taken as equally applicable to each of such one or more counterparts.

HALFTONE IMAGE PRODUCED BY HALF TONE SCREEN

Figures 1A, 1B, 1C:
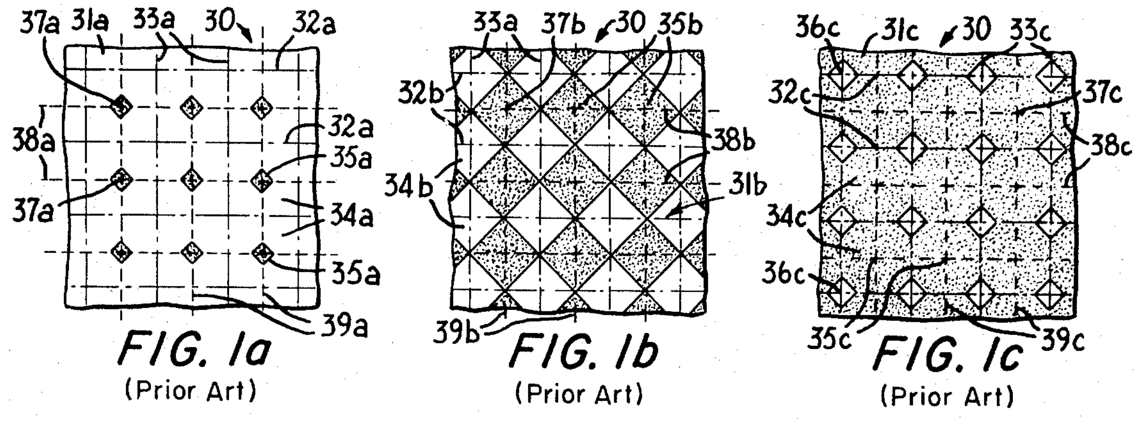
FIG. 1a (Prior Art), FIG. 1b (Prior Art), FIG. 1c (Prior Art)
FIGS. 1a–1c are halftone dot patterns used in printing to reproduce image areas of different tones.

Referring now to the drawings, FIG. 1a shows a sheet of white paper 30 having an area 31a on which a white or very light continuous tone is reproduced in half tone by conventional halftone printing techniques. The area 31a is divided by equidistantly spaced horizontal and vertical lines 32a, 33a into square halftone dot position zones 34a in the center of each of which there is a small halftone dot 35a formed of black ink. Each dot 35a is ideally diamond shaped but, in practice, may be more or less rounded. The dots 35a have respective centers of area 37a positioned at nominal or standard locations for those centers such that the centers are at the insections of a gridiron pattern comprised of a first set of parallel equidistant lines 38a and a second set of parallel equidistantly spaced lines 39a normal to the first set.

When the dots 35a are produced by the use of a photographic halftone screen, the lines 32a and 33a correspond to the lines on the halftone screen, and the number per linear inch of lines 32a and 33a may vary from well under 100 (for a coarse print) to well over 100 (for a high-quality halftone print), the figure of 100 lines per inch being a typical value. The corresponding vestigial dots on a relief printing plate perform the useful function during the printing step of holding the recessed uninked portions of the relief printing plate away from the paper 30.

FIG. 1b shows another area 31b of paper 30 on which an intermediate gray tone is reproduced by black ink halftone dots 35b which are ideally diamond shaped, but which have been increased in size until the corners of the dots are at the sides of the dot zones 34b.

FIG. 1c shows still another area 31c of paper 30 in which a black tone is reproduced by black ink halftone dots 35c which have further increased in size until each dot fills all except the corners of its corresponding zone 34c and, consonantly, merges with the dots of adjacent zones.

Dots 35c are theoretically octagonal in shape to produce diamond-shaped voids 36c at the meeting point of each four adjacent dot zones 34c. In practice, however, dots 35c are distorted from the octagonal shape to produce voids 36c which are more or less ideally rounded.

It is to be noted that area 31c is the tone density reverse of area 31a in that the white voids 36c of area 31c correspond (except for location) with the black dots 35a of area 31a and, consonantly, the large black dots 35c of area 31c correspond (except for location) with the white void spaces surrounding dots 35a within the dot position zones 34a of area 31a.

GENERAL DESCRIPTION OF SYSTEM

A system for reproducing a continuous original tonal image by halftone dots of the sort shown by FIGS. 1a–1c is illustrated schematically in FIG. 2. In FIG. 2, a base 40 supports a motor 41 and bearings 42, 43 in which is journaled a shaft 44 driven by the motor. An opaque drum 45 is coaxially mounted on shaft 44 between bearings 42 and 43 to rotate with the shaft. Coaxially secured to the left-hand end of shaft 44 (leftward of bearing 43) is the right-hand end of a transparent hollow drum 46 open at its left-hand end and rotated by the mentioned shaft. Drum 46 is of the same outside diameter as the drum 45.

Drum 46 has wrapped around its left-hand end a strip 50 of developed photographic film having thereon a grating-type pattern of black bars 51 alternating with white bars 52 (FIG. 4). The rotation of drum 46 by shaft 44 causes relative movement of strip 50 through a scanning zone 53 extending far enough in the circumferential direction of the drum to contain a plurality of the black bars 51. A light projector of the periscope type (shown schematically as light source 54 and lens 55) extends into the left-hand end of drum 46 and directs through filmstrip 50 at scanning zone 53 a beam of light which projects an image of the portion of the strip in zone 53 to a scanner 56 mounted on base 40. As later described in more detail, scanner 56 responds to the received light image to develop a cyclical signal on an output lead 57.

Drum 46 has also mounted thereon a source 60 of an original image to be reproduced in half tone on an image-receptive sensitized member 61 mounted on drum 45. In the FIG. 2 system, source 60 is a black and white photographic transparency which, for convenience, is assumed to be a positive, and member 61 is a sheet of a photosensitive film.

As drums 45 and 46 are rotated in synchronism by shaft 44, sheets 60 and 61 are scanned in synchronism by, respectively, an image scanner 62 and an image-recording means 63 of which both are mounted on a carriage 64 slidable parallel to the axis of the drums on ways 65 mounted on base 40. While units 62 and 63 are scanning sheets 60 and 61, carriage 64 is stationary. Between each scan, however, carriage 64 is stepped leftward by the width of one scan track by a linear carriage drive 66 which may be, say, a drive of the type disclosed in U.S. Pat. No. 2,778,232 issued on Jan. 22, 1957 in the name of R. P. Mork.

Accordingly, the units 62 and 63 scan their corresponding sheets 60 and 61 in identical raster patterns formed of side-by-side scan lines or tracks. In each scanning pattern, the number of side-by-side tracks per inch in the direction transverse to the scanning direction is the same as the number of black lines or bars per inch on the filmstrip 50 in the direction around drum 46. It follows that the spacing of the black bars in strip 50 is the same as the width of each scan track in each scanning pattern, such width being, for example 10/1,000 inch.

Image scanner 62 is actuated in a manner as follows. A periscope-type light projector 70 (represented schematically by light source 71 and lens 72) is inserted into the open left-hand end of drum 46 and is mechanically coupled with carriage 64 (as indicated by dotted line 73) to move axially with the scanner 62. Projector unit 70 directs a beam of light through the positive 60 so as to project to scanner 62 a light image of the tonal detail of the positive which is contained within a restricted illuminated area. That area is caused by the rotation of drum 46 to scan over the positive.

The scanner unit 62 derives from this projected light image an area signal which appears on an output lead 74, and which is representative of the integral of the tonal detail of the positive within the entire illuminated area.

Scanner 62 also views at the center of the mentioned area the tonal detail within an illuminated slit spot having normal to the direction of scanning a width equal to the displacement of scanner 62 during each step of axial movement imparted thereto by drive 66. The rotation of drum 46 causes the spot to scan over the image of the positive so as to define over and for that image a linear scan track of the width of the spot during each scan of the raster pattern by which the image as a whole is scanned.

The light from the mentioned slit spot provides an image signal from which scanner 62 derives left and right electrical half-image signals appearing on output leads 81 and 81', respectively, and representative, respectively, of the tonal detail of the positive contained within the areas of the slit spot which are to the left and to the right, respectively, of the centerline of the scan track traced out by that spot.

The cyclical signal on lead 57, the area signal on lead 74 and the left and right half-image signals on leads 81 and 81' are all fed to an electronic halftone dot generator unit 90 later described in more detail. Within that unit, the half-image signals are modified by the area signal, combined with the cyclical signal and otherwise processed to provide at the output of the unit an overall halftone dot signal divided into a left component on lead 91 (left deflecting signal) and a right component on lead 91' (right deflecting signal). The left and right deflecting signals are supplied to left- and right-hand inputs of a recording means 63 for the purpose of controlling the operation of that means.

Recording means 63 is a unit which projects on photosensitive film 61 a beam of light forming on the film a bright slit spot (exposing spot) of which the width dimension is normal to the direction of scanning of the film by the unit. Such spot is divided in its width dimension into left- and right-hand areas on opposite sides of a point serving as a reference center for the spot. The width of each such spot area is controlled by a dual light valve 100 whose operation is in turn controlled by the deflection signals on leads 91 and 91'.

The rotation of drum 45 causes the mentioned exposing spot to scan over film 61 so as to define over that film (during one scan of the raster pattern by which the whole reproduction area of the film is scanned) a scan track having a width characterizing the spot when both the left and right areas of the spot are of full-width value, and having a reference centerline which is the locus of movement of the mentioned reference centerpoint for the spot as the spot moves over the film. As the spot is so scanning, it is modulated in width to cause successive halftone dots to be exposed on the film in the mentioned scan track. Which such dots are normally positioned to be symmetrically split by the reference centerline for the scan track, in certain instances the presence in positive 60 of a scanned tone density edge will cause the center of area of the exposing spot to be deflected leftward or rightward of such reference centerline so as to give a smoother appearance to the reproduction on film 61 of the edge. By exposing the described halftone dots in each of the scan tracks of the raster pattern by which the film 61 is scanned, the recording means 62 exposes on film 61 a complete halftone image of the original image provided by positive 60. That halftone image is, for convenience, assumed to be a positive in relation to the original positive image such that white, intermediate gray and black areas of the original image are reproduced in the halftone image by halftone dot patterns similar to those shown in FIGS. 1*a*, 1*b* and 1*c*, respectively.

Having briefly described the structural and operational characteristics of the FIG. 2 system, let us now consider the details thereof.

BAR AND IMAGE SCANNERS

In the black-white bar scanner 56 shown in FIG. 3, the light which passes through the bar pattern on strip 50 is directed by lens 110 to form in the plane of an aperture plate 111 a focused image of the portion of the strip which is instantaneously in the scanning zone 53 (FIG. 2). Plate 111 has formed therein a light-passing slit 112 of the shape indicated by the dotted outline 113 in FIG. 4. Slit 112 defines the scanning zone 53 through which the strip 50 moves and which is seen by scanner 56. Outline 113 also defines, therefore, the shape of scanning zone 53.

FIG. 4 may, accordingly, be regarded as a direct view of a portion of strip 50 together with zone 53 or as a view of the image of that strip portion projected to plate 111 together with a view of the outline 113 of the slit 112 in the plate. Depending on the image magnification provided by the optics associated with scanner 56, the portion of the strip within zone 53 may be of the same size (i.e., 1:1 magnification) or of a different size than the portion of the strip image framed by slit 112. Thus, FIG. 4 may be either to the same size scale or to a different size scale for the two views which that drawing may represent. For convenience of further description, however, FIG. 4 will be considered from now on as (1) being a view of the outline of slit 112 and of the image of strip 50 projected to plate 111, and (2) being to the same size scale as FIG. 5.

Mounted on plate 111 directed behind slit 112 is a mask 115 which may be a piece of photographic film. The mask 115 has thereon a pattern of dark bars 116 of low-light transmissivity and of light bars 117 which are of high light transmissivity, and which alternate with the dark bars. The bars 116 and 117 of the mask are of equal thickness in the direction of scanning of strip 50 (vertical in FIGS. 4 and 5) and are of the same thickness in that direction as the individual images in FIG. 4 of the dark and light bars on the scanned strip. Hence, as the strip 50 moves through scanning zone 53, the individual bar images of FIG. 4 undergo successive 360° spatial phase shifts in relation to the bars of mask 115. At one point in each such shift, the bar images of FIG. 4 will register fully with the white bar areas of mask 115 to allow only a minimum of light to pass through the combination of slit 112 and mask 115 and, at a point 180° away, the bar images will fully register with the dark bar areas of the mask to allow a maximum of light to pass through the combination of the mask and slit. It follows that the light through the slit and mask undergoes a cyclical variation from minimum value to maximum value during each of successive periods of which each is the period required for one dark bar (or light bar) of the strip 50 to move completely into or out of the scanning zone 53. Such varying light is directed by an optical system (represented by lens 118) onto phototransistor 120 to be converted by the transistor into corresponding variations in amplitude of the cyclical electric signal which has before been described as appearing on lead 57.

A conventional indicium scanner would scan each bar of strip 50 one at a time in order to derive from the bar pattern a cyclical signal having periods of variation of which each corresponds to a respective one of the scanned bars. The scanner 56 differs in that the mask 115 permits that scanner to provide such a cyclical signal while scanning at any instant both a plurality of the dark bars and a plurality of the light bars of the strip 50. To so scan a plurality of the bars of the strip is advantageous because the effect of any local irregularities in the width or position of the bars is averaged out so that the resulting electric signal has cyclical variations which do not reflect those irregularities.

Referring now to the image scanner 62 shown in detail in FIG. 6, light passing through the positive 60 is directed by an optical system (represented by lens 125) to form a focused image of a restricted illuminated area of the positive on the reflective forward side of an aperture plate 126. Light from that entire image is reflected by the plate and is directed by an optical system (represented by lens 127) onto a phototransistor 128 which converts the received light into the area signal aforedescribed as appearing on lead 74.

Plate 126 has formed therein a rectangular slit 129 which passes light of the projected image derived from an illuminated slit spot 130 (FIG. 7) of the same shape as the aperture slit and disposed on positive 60 at the center of the whole illuminated area of the positive. Depending on the magnification provided by the optics associated with scanner 62, spot 130 may be of the same size or of a different size than the aperture slit 129.

The slit spot 130 is shown in dotted outline in FIG. 7. Such spot has a width transverse to the scanning direction equal to the displacement per step imparted to carriage 64 by drive 66, such displacement per step in turn being selectively set in accordance with the desired fineness in lines per inch of the halftone image produced on film 61. For example, if the desired fineness of the halftone image is 100 lines per inch, the interline spacing in that image is 10/1,000 inch and the displacement per step of carriage 64 and the width of spot 130 are both also 10/1,000 inch. As taught in U.S. Pat. No. 3,194,883 issued on July 13, 1965 in the name of Austin Ross, the spot width is at least 20 times lesser (and, preferably, is lesser by even a larger factor) than the side-to-side dimension of the illuminated area of the positive which surrounds the slit spot 130 and is seen by the phototransistor 128.

Normal to its width, the spot 130 has a thickness or opening size which is substantially less than the width dimension of the spot. Thus, for example, if the width of the spot is 10/1,000 inch, the opening size of the spot may be 2/1,000 inch.

The rotation of drum 46 causes spot 130 to move over the positive 60 in a scan track 135 of the width of the spot and having edges indicated by the dot-dash lines 136. In FIG. 7, the motion of the spot is assumed to be downward relative to the positive 60. Track 135 has a centerline 137 dividing the track into left- and right-hand strips 138, 138' and dividing the spot 130 itself into left- and right-hand halves or areas 139, 139'.

As the spot 130 moves in its scan track 135, the cyclical signal from bar scanner 56 serves as a graduating signal for the track 135 in the sense that the periods of the signal correspond to intervals 132 into which the length of the track is divided as indicated by the dot-dash lines 133. In the FIG. 2 system being described, the length of each interval equals the width of scan track 135, namely, 10/1,000 inch. Hence, the cyclical signal from scanner 56 serves in effect to graduate the scan track 135 into square halftone dot zones 134 contained within the lines 136 and separated from each other by the lines 133.

The linear speed of strip 50 relative to scanner 56 is necessarily synchronized with and is equal to the linear speed of positive 60 relative to scanner 62 because strip 50 and positive 60 have the same angular speed of rotation and are mounted at the same radial distance from the axis of rotation. Further, because in each line-scanning cycle there is the same maintained constant relation between the instantaneous spatial phasing of the bar pattern on strip 50 relative to bar scanner 56 and the instantaneous spatial phasing of positive 60 relative to image scanner 62, the halftone squares 134 in the scan tracks 135 are disposed to line up with each other horizontally from track to track as well as vertically in each track. Hence, the cyclical signal from strip scanner 56 serves, in effect, to graduate the whole raster pattern by which positive 60 is scanned into a pattern of aligned horizontal rows and aligned vertical columns of contiguous square halftone dot zones 134.

Returning to image scanner 62, the light from spot 130 on positive 60 (FIG. 7) which passes through aperture slit 129 (FIG. 6) is directed onto a beam splitter 140 in the form of a metal wedge having highly reflective left- and right-hand wedge sides 141 and 141′. The light derived from the left area 139 of spot 130 is reflected from wedge side 141 as a beam 142 directed by an optical system (represented by lens 143) onto a phototransistor 144. Similarly, the light derived from the right area 139′ of spot 130 is reflected from the wedge side 141′ as a beam 142′ directed by lens 143′ onto a phototransistor 144′. Phototransistors 144 and 144′ respond to the beams which are respectively incident thereon to generate, respectively, the left half-image signal and the right half-image signal which have before been described as appearing on the output leads 81 and 81′.

ELECTRONIC CIRCUITS

Figure 8:
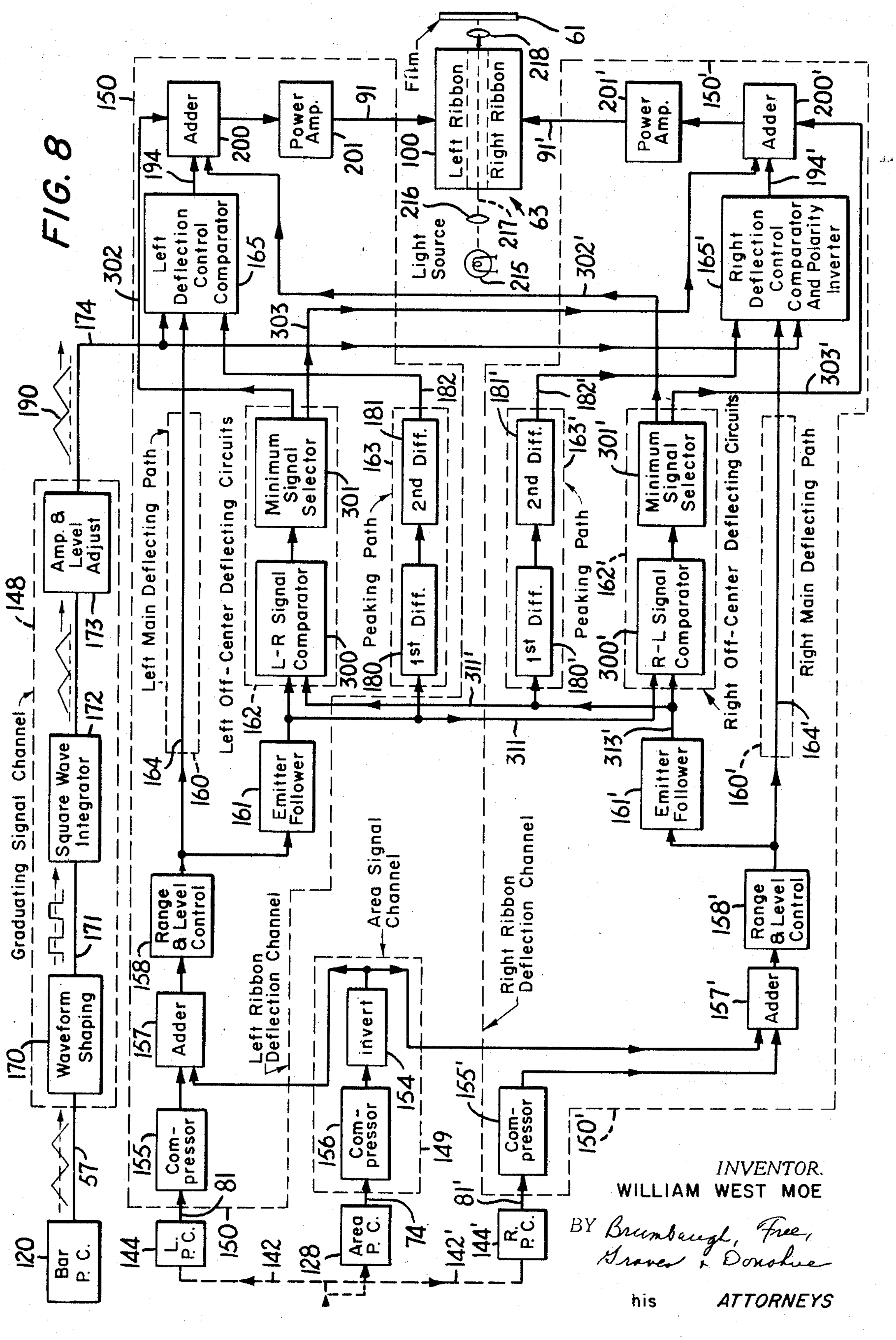

As stated, the graduating signal from photocell 120 of bar scanner 56 and the area signal and left and right half-image signals from, respectively, the photocells 128 and 144, 144′ of the image scanner 62 are all fed to the electronic halftone dot generator unit 90 (FIG. 2) of which the details are shown in schematic block diagram in FIG. 8. Unit 90 is comprised of a graduating signal channel 148, an area signal channel 149 and left and right half-image signal channels 150 and 150′. Each of those channels is provided by solid-state circuits. The left and right half-image signal channels are substantial duplicates (apart from exceptions hereinafter noted). Hence, only the left half-image channel 150 will be described in detail.

In the left channel 150, the half-image signal is fed to a compressor unit 155 within which the signal is compressed to a selective degree (as determined by manually set controls for the unit) in order to compress the range of tone densities represented by the input signal to the range of tone densities capable of being reproduced on the film 61. Signal compressors of this sort are well known in the facsimile reproduction art.

In area channel 149, the area signal from the photocell 128 is passed through a compressor unit 156 similar to unit 155. From unit 156, the compressed area signal is passed through an inverter stage 154 and is then separately combined with the left and right half-image signals in adder stages 157, 157′ which follow, respectively, the compressor units 155 and 155′ in, respectively, the left channel 150 and the right channel 150′. Adder stages 157, 157′ may each be a simple mixing network wherein the two input signals to the network are fed through respective resistors to a common output junction. As described in U.S. Pat. 3,194,883 to Ross, the addition of the area signal to the image (or half-image) signal serves to modify the latter signal so as to boost local contrast in the reproduction. That is, in the instance where the original image is characterized by a local tonal detail contrasting with a surrounding tonal field, the modifying of the image signal by the area signal serves to enhance the local contrast in the reproduction between such detail and such field.

From adder 157, the left half-image signal is fed to range and level control circuits 158 which permit manual adjustment of the DC level of the signal and of the signal's voltage values which respectively correspond to maximum shadow and maximum highlight. Thereafter, the signal is supplied to a main deflecting path 160 and (through an emitter follower 161) to both a left offcenter deflection signal generator 162 and a peaking path 163. The functions performed by the offcenter generator and the peaking path will be considered later. The main path 160 consists merely of a lead 164 which transfers the left half-image signal to the input of a left deflection control comparator 165.

Turning now to channel 148, the waveform of the cyclical signal from photocell 120 of bar scanner 56 is shown in FIG. 8 (above lead 57) as being an approximately triangular wave. That signal is passed through the wave-shaping unit 170.

Figure 35:
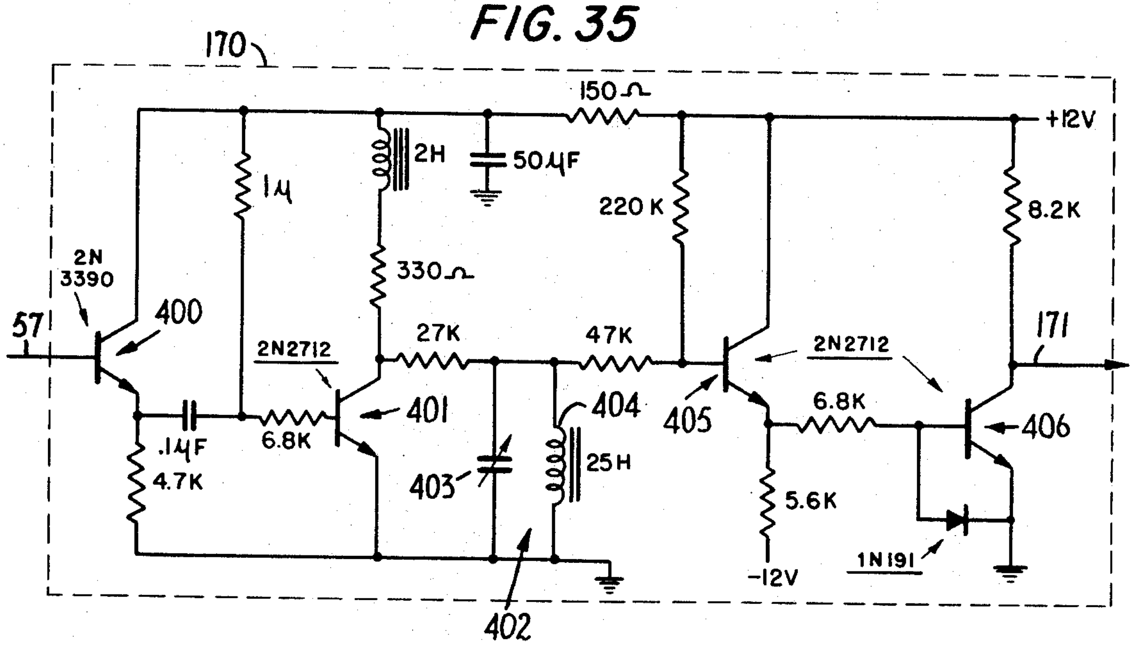
FIG. 35 is a schematic diagram of the circuits of the waveform shaping unit shown of FIG. 8.

As shown by FIG. 35, in unit 170 the photocell signal is fed first to a linearly operating transistor amplifier 400 and then to a limiting transistor amplifier 401 which is nonresponsive to the tops and bottoms of the input signal. Connected in the output circuit of amplifier 401 is a parallel tuned circuit 402 comprised of capacitor 403 and inductor 404. Circuit 402 is tuned to the fundamental of the cyclical signal at the input to unit 170. Accordingly, circuit 402 causes the output from amplifier 401 to be a signal which has the same period as the original signal but is in the form of a sine wave. The advantage in so filtering the photocell signal by a tuned circuit is that the "flywheel" effect of the tuned circuit eliminates transient irregularities caused in the photocell signal by dirt or small defects or flaws in the bar pattern scanned on strip 50 or in the electrooptical system by which that pattern is scanned.

The sine wave output of amplifier 401 is fed to two successive clipping transistor stages 405 and 406 of which each employs only resistors (i.e., has no capacitors) so as to avoid the building up in such stages a DC bias voltage which might drift in value. The stages 405 and 406 severly clip the sine wave signal so as to convert it into a square wave signal which has zero crossings corresponding to those of the sine wave signal but is independent of amplitude variations or other changes in the wave shape of the sine wave signal. Such square wave signal appears on output lead 171 from unit 170 and (as indicated by the waveform shown above that lead in FIG. 8) the square waves of the signal have very steep linear leading and lagging edges. From lead 171, the "squared-up" signal is fed to a conventional integrating unit 172 which integrates the square waveform of the signal to derive therefrom a cyclical signal 190 of sawtooth or triangular wave form characterized by rises and falls which are developed by integration of, respectively, the relatively positive portions and the relatively negative portions of the square wave signal.

Next, the cyclical signal 190 is fed through amplitude and level adjusting circuits 173 which permit manual adjustment of both the amplitude and the DC level of the sawtooth wave. Finally, the adjusted sawtooth graduating signal is supplied via lead 174 as an input to each of the left and right control comparators 165, 165′ which also receive, respectively, the left half-image signal and the right half-image signal through the paths 160 and 160′.

Other inputs to those comparators are provided by the peaking paths shown in FIG. 8. In the left peaking path 163, the left half-image signal is fed to a first differentiator circuit 180 to be electrically differentiated, and the resulting first differential signal is then inverted by an invertor circuit which is not shown, but which may be an output stage of the unit 180. The inverted first differential signal is in turn differentiated in second differentor circuit 181, and the resulting inverted second differential signal is applied via lead 182 to comparator 165 to be added to the left half-image signal to modify the latter before it is compared (as later described) with the sawtooth graduating signal supplied to the comparator. As taught in U.S. Pat. No. 2,865,984 issued on Dec. 23, 1958 in the name of Moe, the modifying of the image (or half-image) signal by the inverted second differential signal serves to "-peak" the image signal in a manner producing accentuation in the reproduction of tone density edges scanned on the original.

Figure 36:
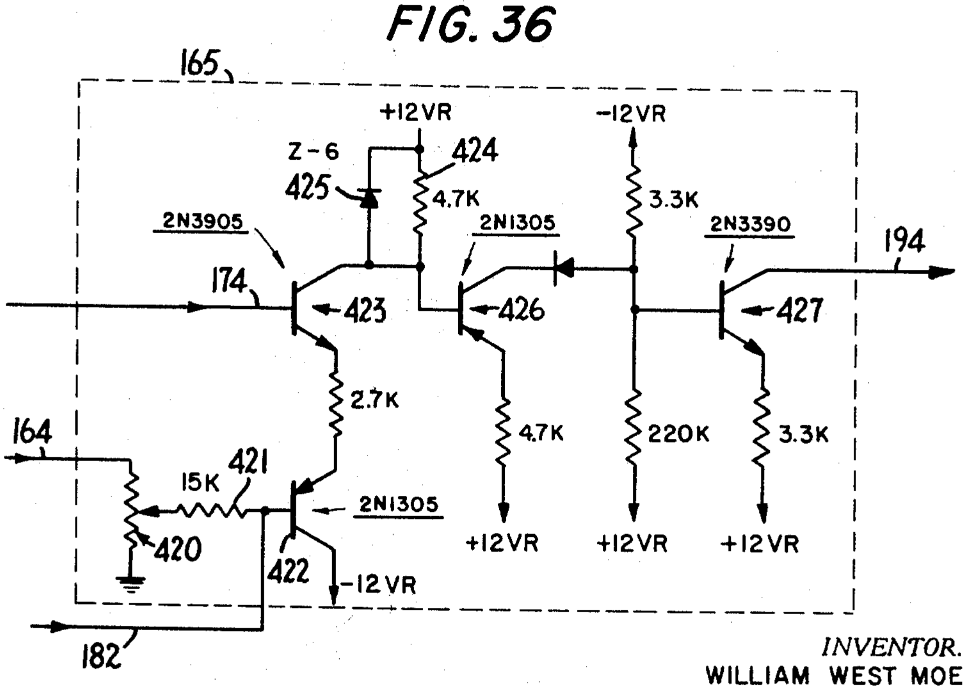
FIG. 36 is a schematic diagram of the circuits of the left deflection control comparator shown in FIG. 8.

FIG. 36 shows the details of the comparator unit 165. In that unit, the left half-image signal on lead 164 is first passed through a selectively adjustable voltage-attenuating potentiometer 420 and is next combined at junction 421 with the peaking signal on lead 182 to be modified by the latter signal. The half-image signal is then applied to the base of an emitter-follower PNP-transistor 422 of which the emitter-collector path is in series with the collector-emitter path of a variable level clipper transistor 423 of the NPN type. Transistor 423 receives on its base the sawtooth graduating signal on lead 174. The collector of transistor 423 is connected to a supply of +12 volts DC by a resistor 424 connected in parallel with a Zener diode 425.

The half-image signal operates through transistor 422 to control the clipper transistor 423 so that no appreciable current flows through the collector-emitter path of the latter transistor unless the instantaneous amplitude of the sawtooth signal 190 on lead 174 is greater than the level of the half-image signal. When, however, that condition is satisfied, the operation of clipper transistor 423 develops across output resistor 424 a left halftone dot signal in the form of a voltage which is proportional to the difference between the instantaneous amplitude of the sawtooth signal and the concurrent level of the half-image signal so long as such voltage does not exceed the threshold value at which Zener diode 425 breaks down to conduct substantial current. If the voltage of the halftone dot signal tends to exceed that threshold value, then diode 425 conducts to limit the rise in voltage to close to that value so as, in effect, to clip off the top of the waveform of the halftone dot signal.

Figure 9:
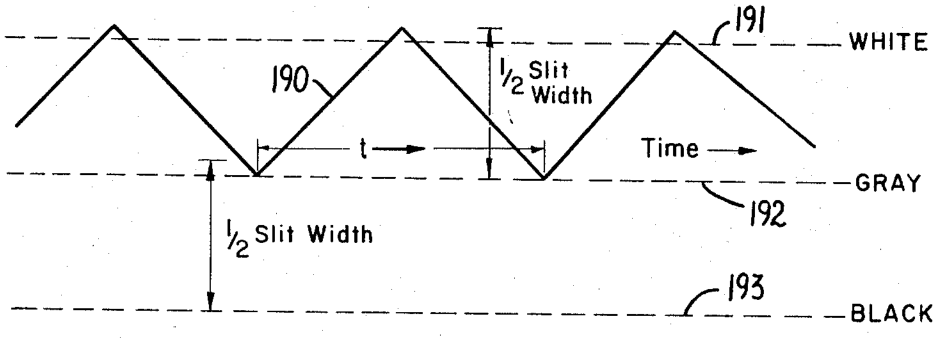
FIGS. 8 and 9 are, respectively, a block diagram and a waveform diagram for the electronic circuitry employed in the system of FIG. 2.

FIG. 9 illustrates in more detail the described operation of comparator 165. In FIG. 9, the shown period *t* of the sawtooth signal 190 corresponds to the width (in the scanning direction) of one of the bars on scanned strip 50 (FIG. 4) and to the length (in the scanning direction) of one of the intervals 132 (FIG. 7) into which scan track 135 is, in effect, divided by the graduating signal 190 (FIG. 9).

Assume, first, that the left half-image signal is at the "white" level indicated by line 191. Then, the instantaneous amplitude of signal 190 exceeds level 191 for only the short time interval at the center of period *t*, and it is only during such interval that the comparator provides an output. Since the instantaneous amplitude of such output is proportional to the difference between the instantaneous amplitude of signal 190 and the level 191, such output will be a short-lasting signal having a triangular waveform corresponding in shape to the small triangular part of signal 190 which lies above level 191.

Assume next that the left half-image signal is at the intermediate gray level indicated by line 192. In that instance, the difference between signal 190 and the level of the half-image signal will be zero only at the beginning and end of period *t*, and the rest of the time the amplitude of signal 190 will be greater than level 192. Accordingly, the output of the comparator will be a signal with a triangular wave form proportional in size and shape to the full triangle of signal 190 which is above level 192, and which extends horizontally over all of period *t*.

Assume, finally, that the left half-image signal is at a "-black" level indicated by line 193. In that latter instance, the instantaneous amplitude of signal 190 will be greater than the level of the half-image signal even at the beginning and the end of period *t*. Therefore, the output of the comparator will be a halftone dot signal having a waveform constituted of a clipped triangular component superposed on a DC component. In the absence of Zener diode 425, the triangular component of such waveform would be proportional in amplitude and shape to the triangle of signal 190 shown in FIG. 9 as being above level 192. Zener diode 425 operates, however, to clip off the top of the waveform of the triangular component. The DC component of the halftone dot signal will be proportional in amplitude to the difference between levels 192 and 193.

From the foregoing, it will be evident that the left halftone dot signal produced by the described comparing action is variable in size or in both size and shape as a function of the magnitude of the half-image signal.

In comparator 165, the clipper stage which generates the halftone dot signal is succeeded by other conventional stages which are provided by transistor 426 and 427 (FIG. 36) and which amplify that signal and adjust the DC level thereof. After being so amplified and level adjusted, the halftone dot signal is fed by lead 194 to an adder 200 (FIG. 8) which performs an important function in the described system, but which will be considered for the time being as passing the left halftone dot signal without change. From adder 200, the discussed signal is amplified in a power amplifier 201 and is then applied via lead 91 as one of the two electrical inputs to the light valve 100 of the recording means 63. The other input to the light valve is a right halftone dot signal supplied via lead 91' from power amplifier 201'. That right signal is derived in the right channel 150' from the output sawtooth signal from channel 148 and from the right half-image signal in the same way as the left halftone dot signal was derived, as described, from that sawtooth signal and from the left half-image signal. Before, however, the right halftone dot signal is applied to light valve 100, it is inverted in polarity relative to the left halftone dot signal by a polarity inverting stage which is present in the right control comparator 165' but not in the left control comparator 165.

HALFTONE DOT RECORDER

Figure 10:
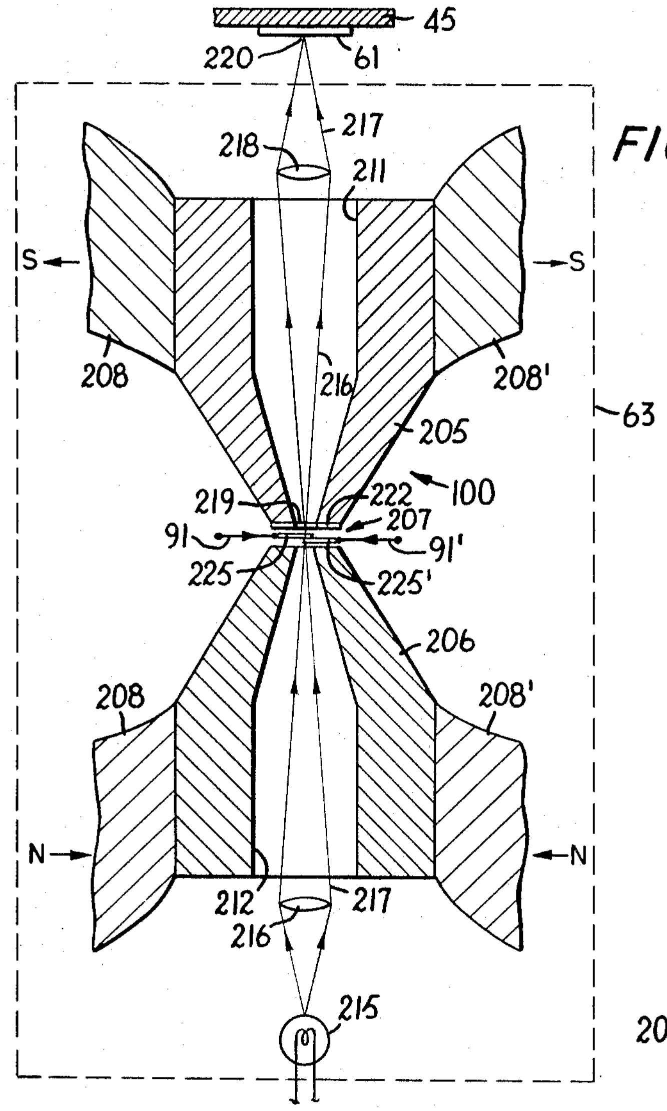
FIG. 10 is a schematic plan in cross section of the recording means of the FIG. 2 system.

FIG. 10 shows by a cross-sectional plan view the details of a dual light valve 100 and the associated components which constitute the recording means 63. Valve 100 is comprised of a pair of magnetically permeable pole pieces 205, 206 each having a rear portion which is of elongated rectangular cross section (in planes normal to the drawing), the long dimension of the rectangular cross section being perpendicular to the drawing plane. The forward portions of pieces 205, 206 are wedge shaped and are convergently tapered towards a flux gap 207 separating the two pole pieces. A strong permanent magnetic field is developed in gap 207 by left and right permanent horseshoe magnets 208, 208' (shown only in part in FIG. 10) of which the respective north poles bear against the opposite sides of the rectangular rear portion of pole piece 206, and of which the respective south poles bear against opposite sides of the rectangular rear portion of pole piece 205.

Pole piece 205 has formed therein a central bore 211 which extends through the pole piece from its rear to gap 207, and which has a convergent conical taper in the forward direction (towards gap 207) at its forward end. A like bore 212 is formed in pole piece 206. Bores 211 and 212 are coaxial so as to conjointly form a passageway for light through pole piece 206, gap 207 and the pole piece 205.

Such light is provided by a light source 215 disposed to the rear of pole piece 206 along the axis of the bores. An optical system (schematically represented by lens 216) forms the light from source 215 into a beam 217 projected through bore 212 along the bore axis. The light of such beam which passes through gap 207 continues through bore 212 and, upon emerging therefrom, is focused by an optical system (schematically represented by lens 218 into a spot 220 on the film 61 mounted on rotating drum 45 (FIG. 2).

Figure 13:
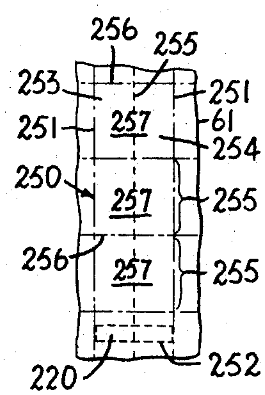
FIG. 13 is an enlarged view of a portion of the reproduction made by the recording means of FIG. 10.
Figure 11:
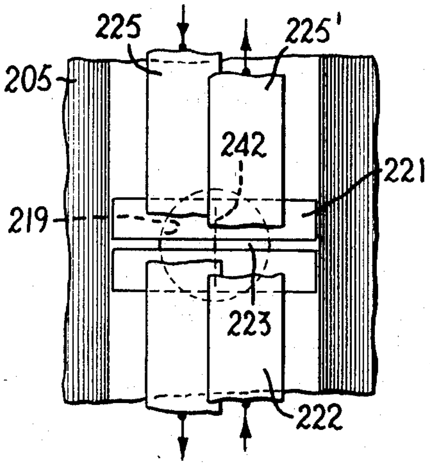
FIGS. 11 and 12a, 12b are enlarged schematic views of details of such recording means.

As best shown in FIG. 11, a pair of thin parallel plates 221, 222 are mounted on the forward end of pole piece 205 in gap 207 and over the circular opening 219 of bore 211 so that the plates and the opening conjointly define an aperture slit 223. That slit shapes the beam passing through bore 211 to cause the spot 220 on film 61 to be in the form of a slit spot 200 (FIG. 13) which (when the size and shape of spot 220 is controlled wholly in slit 223) is a duplicate in shape of the slit spot 130 (FIG. 7) and is equal in width to the displacement per step imparted (FIG. 2) to carriage 64 by axial stepping drive 66. That is, when the light of beam 217 which passes to spot 220 is limited only by the aperture slit 223, the slit spot 220 has for a width (transverse to the scanning direction) the exemplary value of 10/1,000 inch and a thickness (in the scanning direction) of 2/1,000 inch. Depending on the optics employed in the recording means 63, the full-size slit spot 220 may be either of the same size or of a different size than the aperture slit 223.

The width of slit spot 220 is controlled by the effect on beam 217 of left and right current-conductive metal ribbons 225, 225' disposed in gap 207 in the path of beam 217 and each extending through such gap normal both to the axis of bores 211, 212 and to the plane of lie of the magnets 208, 208'. Each ribbon is a laminate structure comprised of a titanium strip of 0.0005 inch thickness bonded by epoxy resin to an aluminum strip of 0.0005 inch thickness. The titanium and aluminum strips of each ribbon separately impart thereto the strength and the conductivity which the ribbon is required to have. The two ribbons are each about 2½ inches long and are stretched taut between end supports (not shown). Each of the ribbons throughout most of its length is disposed in the gap 207 between the pole pieces 205, 206 so as to be exposed to the magnetic flux in that gap.

As a difference from the prior art, valve 100 is big enough to permit transverse deflection of its ribbons by as much as about 15/1,000 inch per ribbon. In contrast, the prior light valves (which are used, say, for recording sound on motion picture film) are characterized by a maximum deflection of each ribbon of only about 1/1,000 inch.

As shown in FIG. 10, the ribbons 225, 225' are slightly displaced from each other (in the direction of beam 217) and overlap slightly transverse to the beam so as to wholly cut off the beam when both ribbons are deenergized. Left ribbon 225 is energized by the left halftone dot signal with current which flows downwardly through the ribbon to cause the central portion 230 of that ribbon (FIG. 12*a*) to deflect leftwardly because of repulsion developed between the permanent magnet field in flux gap 207 and the magnetic field developed around ribbon 225 by such current. Right ribbon 225' is energized by the right halftone dot signal with current which flows upwardly through the ribbon to cause the central portion 230' of the right ribbon to deflect rightwardly.

Figures 12A, 12B:
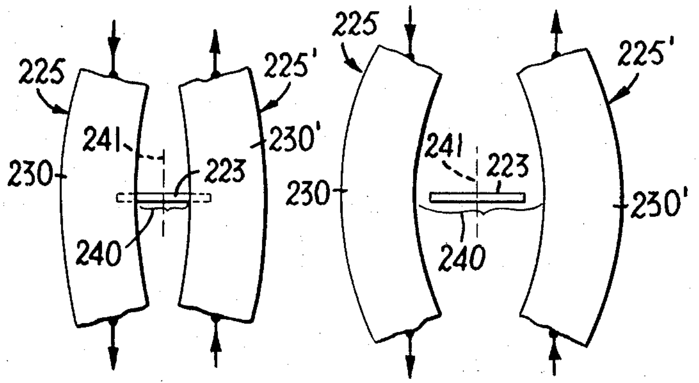

FIGS. 11 and 12*a*, 12*b* show various degrees of deflection of the ribbons of the light valve. In FIG. 11, no signal current flows through either ribbon, and they are wholly undeflected so as to block completely the passage of the light beam 217 to film 61.

In FIG. 12*a*, the ribbons 225 and 225' are deflected by a signal currents of intermediate strength and of the same value so that the central portions of the ribbons are spaced apart by a ribbon gap 240 of which the center in the width direction of the gap is marked by the dotted line 241. The respective deflections of the two ribbons are away from the center 241, and the ribbon gap center 241 coincides with the slit center 242 (FIG. 11) throughout the dynamic deflections of the two ribbons.

In any case of ribbon deflection, the total individual deflection of each ribbon may be resolved into an oncenter component away from the other ribbon and into an offcenter component which may be either toward or away from the other ribbon and may be either smaller or larger than the oncenter component. In this connection, rightward and leftward deflections are considered to have a positive sign and a negative sign, respectively. The respective oncenter deflection components of the two ribbons are of equal magnitude but of opposite sign, and the respective offcenter deflection components of those two ribbons are of equal magnitude and of the same sign. When the total individual deflection of each ribbon is so resolved, the width of the ribbon gap 240 is equal to twice the magnitude of the oncenter component of the two ribbons, and the transverse displacement of gap center 241 relative to slit center 242 is of the same magnitude and sign as the offcenter component of each of the two ribbons. To put it another way, the magnitude of the oncenter component present in both ribbons can be determined by dividing by two the width of the ribbon gap 240, and the magnitude and sign of any offcenter component characterizing both ribbons can also be readily determined because the latter component is the same in magnitude and sign as the displacement, if any, of the gap center 241 from the slit center 242.

In the ribbon deflection shown in FIG. 12*a*, the amount of deflection is insufficient to carry the inner edges of the central portions 230, 230' of the ribbons out past the ends of the aperture 223. Therefore, the width of the slit spot 220 will vary in accordance with the variation in width of the gap 240 between the two ribbons. In FIG. 12*b*, however, strong signal currents have deflected the ribbons outwardly beyond the ends of the slit aperture and, as long as the ribbons are so positioned, the width of spot 220 is determined by the width of the aperture slit and is constant at its maximum value of 10/1,000 inch. This situation continues until a decrease in the signal current through the ribbons cause them to come back within the ends of the aperture slit so as to regain control over the width of the slit spot. The control is thereafter maintained until the ribbons are again deflected outwardly of the ends of the aperture slit. It might be noted that in the "overshoot deflection" of the ribbons depicted in FIG. 12*b*, the limiting action of Zener diode 425 (FIG. 36) prevents the currents in the ribbons from rising to a value at which the ensuing overdeflection of the ribbons would or might cause the ribbons to break.

As the drum 45 rotates, the slit spot 220 scans over the film 61 (FIG. 13) in a linear scan track 250 of which the opposite edges are indicated by the dot-dash lines 251. Track 250 has a width corresponding to and defined by the width of the area 252 occupied by the slit spot 220 when ribbons 225, 225' are deflected outwardly of the ends of aperture slit 223. As shown, track 250 is divided into a left strip 253 and a right strip 254 by a centerline 255 corresponding to the center 242 of the aperture slit.

Since, as presently described, the FIG. 2 system reproduces the original image in 1:1 size relations, the width of the scan track 250 for film 61 is the same as the width of the scan track 135 for positive 60 (FIG. 7), e.g., 10/1,000 inch. Accordingly, the periods of the sawtooth signal 190 (FIG. 9) serve in a similar manner to graduate the scan track 250 into lengthwise intervals 255 of which the divisions therebetween are indicated by the dot-dash lines 256. Each of intervals 255 has a length equal to the width of the track 250. Hence, that track is, in effect, divided by the sawtooth graduating signal 190 into a succession of square halftone dot zones 257.

The speed of scanning of spot 220 over film 61 is synchronized with the speed of scanning of spot 130 over positive 60. Moreover, because the scanning of positive 60 is synchronized in space phase (as already described) with the scanning of the bars on strip 50, and because the scanning of film 61 is synchronized in space phase with the scanning of positive 60 (by virtue of drums 45 and 46 being locked together in rotation), each of the successive tracks 250 of the raster pattern scanned over film 61 will have the same space phasing of the dot zones 257 therein as the space phasing of the dot zones in the adjacent tracks. Hence, the dot zones 257 in the raster scanning pattern for film 61 will form horizontal rows as well as vertical columns just as do the square halftone dot zones 134 (FIG. 7) in the raster pattern by which the positive 60 is scanned.

HALFTONE DOT REPRODUCTION OF UNIFORM TONES

FIGS. 14*a*–16*a* and FIGS. 14*b*–16*b* illustrate the character of the halftone dots exposed on film 61 in response to a scanning of various uniform tones on positive 60. In each of FIGS. 14*a*–16*a*, the slit spot 130 is deemed to be moving downward over the positive in a scan track 135, and, as described, such scanning by the spot will produce separate left and right half-image signals from the left and right strips 138, 138' of the track. Because the scanned tone represented by any one of FIGS. 14*a*–16*a* is a uniform tone, the two half-image signals derived from that particular tone will be equal in level so as to result in purely on-center deflections of the ribbons of the light valve. On the other hand, the three different tones which are shown respectively by FIGS. 14*a*–16*a* will produce left and right half-image signals per tone which differ in level from tone to tone.

Figures 14A, 14B, 15A, 15B, 16A, 16B, 17:
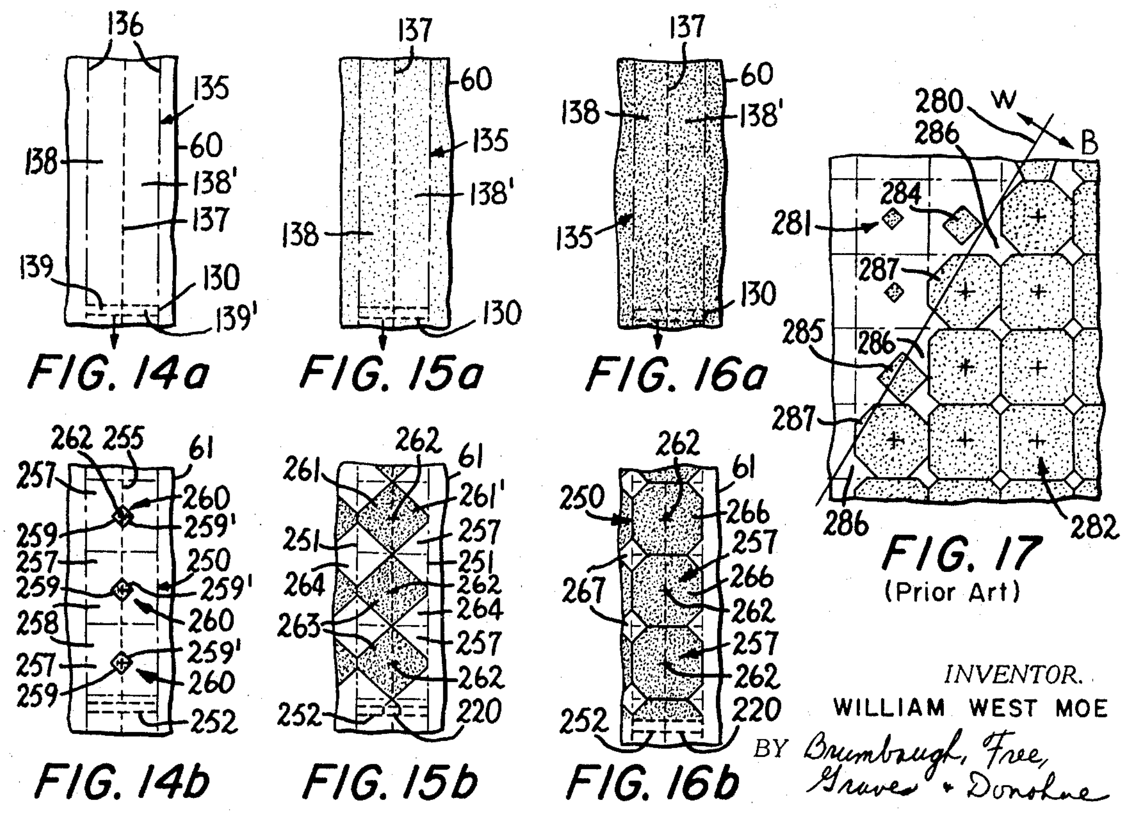
FIG. 14a, FIG. 15a, FIG. 16a, FIG. 17 (Prior Art), FIG. 14b, FIG. 15b, FIG. 16b
FIGS. 14a, 15a, 16a and FIGS. 14b, 15b and 16b are diagrams illustrative of dot formation by the FIG. 2 system in the absence of a tone density edge.
FIG. 17 is a view of a tone density edge as conventionally reproduced by halftone printing.

In FIG. 14*a*, a white or very light tone is being scanned on positive 60. In that instance, the light derived from the scanning over left strip 138 by left area 139 of spot 130 is high-intensity light productive of a left half-image signal having the white level 191 (FIG. 9). As described, the differential combining of sawtooth signal 190 with an image signal of such white level produces a left halftone dot signal with a triangular waveform corresponding to that of the portion of sawtooth signal 190 above the level 191. Such left halftone dot signal is supplied in the form of a current signal to light valve 100 to cause the left ribbon 225 to deflect away from the slit center 242 in an amount which is instantaneously proportional to the magnitude of the signal current. Hence, the deflection with time of the central portion 230 of ribbon 225 away from the slit center 242 is represented by a short-lasting triangular waveform the same as that of the left halftone dot signal which energizes the ribbon.

The result of the actuation of the left ribbon is shown in FIG. 14*b*. The short-lasting deflection of ribbon 225 opens a passage between it and the slit center 242 for light in the beam 217 to pass to film 61 and expose on that photosensitive film a triangular-shaped left half 259 for each of a succession of halftone dots 260. Symmetrical right halves 259' of the dots 260 are exposed on film 61 by actuation of the right ribbon 225' by a right halftone dot signal derived from scanning the tone in right strip 138' of track 135. That right signal is similar (except for reversed polarity) to the left halftone dot signal. Hence, a white or light tone on the positive is reproduced on film 61 (when developed) by a pattern of small-size diamond-shaped black halftone dots 260 in a white field 258. Because film 61 is a high gamma film, the dots 260 are full black throughout substantially the entire expanse of each.

In FIG. 15*a*, the tone being scanned on positive 60 is an intermediate gray. As earlier discussed (in connection with FIG. 9), such scanning of a gray tone in left strip 138 of scan track 135 develops a left halftone dot signal having a triangular waveform which lasts for the full period *t* of the sawtooth signal 190, and which corresponds to the portion of that sawtooth signal above gray level 192. Also, the scanning of such gray tone in right strip 138' develops a right halftone dot signal similar to the left signal except for being reversed in polarity.

Those two halftone dot signals of triangular waveform cause the left and right ribbons 225 and 225' to each deflect away from the slit center 242 in an amount which varies triangularly with time to cause the ribbons at the peaks of their deflections to be disposed slightly outward of the ends of aperture slit 223. Such deflections of the left and right ribbons in turn result (FIG. 15*b*) in the exposure on film 61 by beam 217 of left and right halves 261 and 261' of a succession of black halftone dots 263 of which each is disposed in one of the zones 257 into which scan track 250 is divided. As shown, the left and right halves of the exposed dots are primarily in the form of triangles. Because, however, the ribbons 225, 225' at the peaks of their deflection are disposed slightly outwards of the ends of aperture slit 223, the triangles defined by the dot halves have blunted vertices at the edges 251 of the scan track 250. Hence, the dots 263 are in the shape of distorted hexagons which, however, approach closely to being diamond shaped. Each dot 263 contacts all four sides of the dot zone 257 in which it is disposed, and the black dots 263 form a checkerboard pattern with white voids 264 disposed between the dots and of approximately the same size as the dots.

FIG. 16*a* represents the scanning of a very dark or black tone on the positive 60. For such black tone, the left and right half-image signals are at the black level 193 (FIG. 9), and the left and right halftone dot signals have instantaneous magnitudes proportional to the difference between level 193 and the instantaneous magnitude of sawtooth signal 190. That signal, however, has its top clipped during much of period *t* by the action of Zener diode 425. Hence, over each period *t* of signal 190, the left and right halftone dot signals will each be constituted of a clipped triangular waveform component superposed on a DC component.

Because of such DC component, the ribbons 225, 225' at the start of each period *t* are deflected away from the slit center 242 but are within the ends of the aperture slit 223. During the first part of the period, the rising magnitude portion of the triangular component of the halftone dot signals effects a further progressive deflection of the ribbons to soon drive those ribbons out beyond the aperture ends. The ribbons so stay during the central portion of the triangular component until, during the last part of the period, the falling magnitude portion of the triangular component of the signals causes the ribbons to return within the ends of the apertures. The ribbons then move further inward to return at the termination of the period to their original positions at which they are held spread apart by the DC component of the halftone dot signals.

The result of the described deflections of the ribbons is that beam 217 exposes on film 61 a succession of black halftone dots 266 which are octagonally shaped as shown in FIG. 16*b*. Each of dots 266 almost fills its zone 257 and is connected by a neck both to the adjacent dots in the same scan track and to the adjacent dots in adjacent scan tracks. Hence, the dots 266 of FIG. 16*b* conjointly form a black field surrounding small white voids 267. Such pattern is the tone density reverse of that shown by FIG. 14*b* since conversion of the black dots 266 to white will yield (with some change in position) the white field of FIG. 14*b*, and conversion of the white voids 267 to black will yield (with some change in position) the black half tone dots 260 of FIG. 14*b*.

It will be noted that in each of FIGS. 14*b*, 15*b* and 16*b*, the centers of area of the halftone dots coincide in position with the centers 262 of the zones 257 so as to be at the standard or nominal locations for those centers of area.

By comparing FIGS. 14*b*, 15*b* and 16*b* to FIGS. 1*a*, 1*b* and 1*c*, respectively, it will be seen that the electronically produced half tone dot patterns of FIGS. 14*b*–16*b* correspond very closely to the photographically produced halftone dot patterns represented by FIGS. 1*a*–1*c*. The described FIG. 2 system is, therefore, adapted to electronically convert an original image into a half tone image having a dot structure which is the same, practically speaking, as that which would be obtained if the original image were to be photographically converted into a halftone image by the use of a conventional halftone screen.

OFFCENTER SHIFT INDUCED BY TONE DENSITY GRADIENT

The description so far has been confined to situations wherein the tones scanned on the positive have been uniform on opposite sides of the centerline 137 (FIG. 7) of the scan track 135 and, accordingly, the halftone dot signals from the left and right areas 139, 139' of slit spot 130 have been the same (except for polarity) and have produced pure oncenter deflections of the valve ribbons 225, 225'. For such scanning situations, it is not necessary to have a dual scanner which resolves the slit spot 130 into left and right areas. Instead, the same halftone dot patterns as are shown in FIGS. 14*b*–16*b* can be formed on film 61 by employing a nondual scanner which converts the light from the whole width of slit spot 130 into an image signal processed in only one of channels 150, 150' and then applied with opposite polarities to the ribbons 225, 225' to deflect such ribbons from each other as a function of the magnitude of the signal. As will now be discussed, however, the division of the slit spot 130 into left and right areas and the division of the electronic circuitry into left and right channels for separate signals from those areas does play an important part in the operation of the FIG. 2 system because that division permits the smoothening of tone density edges in the reproduced halftone image.

In this matter, first consider FIG. 17 which is a composite drawing representative of both an original image and of a halftone reproduction of that image produced by the use of a photographic halftone screen. The line 280 in FIG. 17 represents a tone density edge on the original between an upper left white area and a lower right black area. When the original is converted into half tone by the use of a halftone screen, edge 280 is reproduced by a distribution of halftone dots at the boundary between an upper left white-representing dot pattern 281 and a lower right black-representing dot pattern 282. Along such boundary, there are intermediate size dots 284, 285 which are wholly or partly detached from the black pattern 282. Also, the boundary between patterns 281 and 282 is characterized by deep bays 286 in the black pattern and by correspondingly large juts 287 of the black pattern into the white pattern. Hence, when the originally sharp edge 280 is reproduced photographically by the employment of a halftone screen, the reproduced edge will appear to the eye as a jagged and fuzzy zone between the white and black patterns 281, 282 rather than as a sharp line of demarcation between those patterns.

In the FIG. 2 system, a sharp original tone density edge is reproduced by a halftone edge which is rendered substantially smoother than the jagged edge of FIG. 17. This edge smoothening is obtained from the features of the described system that (1) the valve ribbons 225 and 225' respond independently to the respective brightness of the left and right areas 139, 139' of the slit spot 130, and (2) means are provided by the system to supplement the heretofore described left and right half-image signals by offcenter deflection signals which produce a deflection or shift of both ribbons in the same direction.

The optimum shift as a function of disposition is shown in FIGS. 18–21 for four different dispositions of a tone density edge 289 which may be encountered on positive 60. Those four dispositions are: an edge running from right to left and progressing from white to black in the direction of scanning (FIG. 18), an edge running from left to right and progressing from black to white in the scanning direction (FIG. 19), an edge running from right to left and progressing from black to white in the scanning direction (FIG. 20), and an edge running from left to right and progressing from white to black in the scanning direction (FIG. 21). In order to simplify the description, it is assumed that in FIGS. 18–21 the areas on opposite sides of the tone density edge are black and white, respectively, so as to provide the maximum contrast obtainable in positive 60 between the tonal areas on opposite sides of the edge. Instances where a tone density edge provides less than maximum contrast will be considered later.

In each of FIGS. 18–21, a shift line 290 is shown as being superposed on the portion of positive 60 which produces such shift line. The line 290 represents the optimum transverse shift or offcenter deflection of the ribbon gap center 241 away from aperture slit center 242 to be added to the deflections of the ribbons produced by the left and right half-image signals in main paths 160, 160' (FIG. 8). From an inspection of FIGS. 18–21, it will be seen that the characteristics of such optimum shift line are as follows.

First, the shift is always in the direction towards the dark side of the edge 289.

Next, consider the moving areas of the left and right strips 138, 138' of scan track 135 which are respectively and simultaneously scanned by the left and right halves 139, 139' of slit spot 130 over the length of track 135 within which tone density edge 289 crosses that track. Note that a selected one of the two strips 138, 138' is a "reference" strip providing a whiter scanned portion throughout such length than does the other or "compared" strip. The second characteristic is that the shifting represented by line 290 occurs while the average tone of the scanned area of the "compared" strip is changing but not while the average tone of the scanned area of the "reference" strip is changing.

For example, in the scanning situation represented by FIG. 18, left strip 138 is the "reference" strip, and a shift 290 occurs in the length interval of track 135 over which edge 289 is crossing the compared strip 138' so as to cause the average tone seen in the right half 139 138' of spot 130 to progressively become darker. However, no shift 290 occurs in the length interval over which edge 289 crosses "reference" strip 138 even though the latter crossing causes a progressive change in the average tone seen in the left half of slit spot 130.

As another example, in FIG. 20, the right strip 138' is the "reference" strip, no shift 290 occurs in the length interval of track 135 over which edge 289 is crossing the reference strip to cause the average tone seen in the moving area scanned in that strip to become progressively lighter, but a shift 290 occurs in the length interval over which edge 289 crosses the "compared" strip to cause the average tone of the moving area scanned in that strip over such interval to become progressively lighter in tone.

Third, as corollaries of the stated second characteristic (and of which examples have just been given), the shift line 290 is coextensive (in the scanning direction) in scan track 135 only with that segment of tone density edge 289 which crosses the "compared" strip. Further, such shift line has end points corresponding in the length of track 135 to the points where, respectively, edge 289 crosses the outside margin 136 of the "compared" strip and edge 289 crosses the centerline 137 of the scan track.

Fourth, between those end points of zero shift the shift 290 reaches a maximum or peak half way between such end points. At that point, the scanned area of the "compared" strip is half white and half black and, hence, is seen as an intermediate gray.

Fifth, such maximum shift is equal to half the width of the "compared" strip.

FIGS. **22*a*–22*c* illustrate variants of the edge-scanning situation of FIG. 18** wherein, as shown by that figure, the edge runs from right to left and the scanned tone changes from white to black in the scanning direction.

In FIG. **22*a*, the tone density edge 289 crosses scan track 135 at a more acute angle than it does in FIG. 18. By comparison of FIGS. 18 and 22*a*, it will be seen that, in each case, the length in the scanning direction of shift line 290 extends between the points at which edge 289 cuts, respectively, the outside margin 136 of the "compared" strip 138 and the centerline 137 of track 135. In FIG. 22*a*, line 290 has a greater length than in FIG. 18 because edge 289 crosses track 135 more obliquely in FIG. 22*a* than in FIG. 18. That is, the length of shift line 290** is a function of the angle made by the scanned tone density edge with the track in which that edge is scanned.

As a further consideration, neither the size nor shape nor position of shift line 290 is a function of the space phasing of the halftone dot zones into which scan track 135 is divided. Specifically, whether such track is divided into zones having a space phasing indicated by the shown zone intervals 255 or into zones which are indicated by intervals 255' as being displaced 180° from the first-named zones (but which may have any other space phasing relative to the first-named zones), the size, shape and position of the shift line 290 will be the same.

FIGS. **22*b* and 22*c* illustrate limiting cases wherein, respectively, the edge 289 coincides with the centerline 137 of scan track 135 and the edge 289** extends normally across that scan track. In neither case is any shift produced.

It is to be understood that the foregoing discussion of the variants shown by FIGS. **22*a*–22*c* of the edge illustrated by FIG. 18 is analogously applicable to corresponding variants of the edges represented by FIGS. 19, 20 and 21**, respectively.

OFFCENTER DEFLECTION SIGNAL GENERATORS

Now referring back to FIG. 8, the ribbon shifts represented by the variously shown shift lines 290 are produced by left and right offcenter signal generator units providing the branch paths 162 and 162' in respectively, the left channel 150 and the right channel 150'. As illustrated, the left offcenter signal generator is comprised of a left-right signal comparator 300 and a minimum signal selector 301. Right offcenter signal generator is similarly comprised of a right-left signal comparator 300' and a minimum signal selector 301'. The offcenter generators are operable only if the slit spot 130 intercepts a tone density edge or other tone density gradient sufficiently pronounced to produce a difference between the respective average tones of the areas of the track strips 138, 138' being scanned by the separate halves of slit spot 130. When such difference exists, only one of the generators is enabled to produce an offcenter deflection signal. The selection of the one of the two offcenter signal generators which is enabled is determined by which one of the four edge-scanning situations of FIGS. 18–21 is encountered by slit spot 130 in the course of scanning.

Specifically, tone density edges of the types shown by FIGS. 18 and 19 cause the right generator 162′ to be enabled, whereas tone density edges of the types shown by FIGS. 20 and 21 cause the left generator 162 to be enabled.

When right generator 162′ is enabled, it supplies duplicate right offcenter deflection signals by leads 302′, 303′ to, respectively, the adders 200 and 200′ in left and right channels 150, 150′ so that such offcenter deflection signals are added to the left and right halftone dot signals in those channels. The right offcenter deflection signals produce respective current components passing in the same direction through the ribbons 225, 225′ of light valve 100. Each current component produces a rightward component of deflection of the corresponding ribbon. When left offcenter generator 162 is enabled, it supplies duplicate left offcenter deflection signals via leads 302, 303 to respectively the left adder 200 and the right adder 200′. The two left offcenter signals cause the flow through ribbons 225, 225′ of respective current components which are oppositely directed to those produced by generator 162′, and of which each is productive of a leftward component of deflection of the corresponding ribbon. The effect, therefore, of the left offcenter current components is to generate a leftward deflection of both ribbons.

Each of generators 162 and 162′ may be comprised of circuits shown in detail by FIG. 23 which is, specifically, a schematic diagram of the right-left signal comparator 300′. That comparator is comprised of two solid-state phase splitter stages 305, 306 connected to a common junction 307 providing a supply of +12 volts DC for both stages. Stage 305 is comprised of an NPN-transistor 308, a resistor 309 connected between junction 307 and the collector of 308, a resistor 310 supplying the left half-image signal $V_L$ on lead 311 to the base of transistor 308, and a resistor 312 connecting the right half-image signal $V_R$ on lead 313′ to the emitter of transistor 308. Stage 306 is comprised of an NPN-resistor 314, a resistor 315 connected between junction 307 and the collector 314, a resistor 316 supplying the right half-image signal $V_R$ on junction 304 to the base of transistor 314, and a resistor 317 connecting the emitter of transistor 314 to a supply point 318 of −6 volts DC.

The minimum signal selector stage 301′ is comprised of two NPN-transistors 320 and 321 having their bases connected to, respectively, the collector of transistor 308 in phase splitter stage 305 and the collector of transistor 314 in phase splitter stage 306. The collectors of transistors 320 and 321 are connected through respective resistors 322 and 323 to a supply of +12 volts DC. The emitters of the transistors 320 and 321 are connected to −12 volts DC through a common resistor 325. The output of selector stage 301′ appears at the junction of the last-named emitters with resistor 325. That output is fed by lead 326 and an intermediate PNP-amplifier (not shown) to two parallel conventional PNP-amplifiers 327 and 328 which supply duplicate right offcenter deflection signals by, respectively, leads 302′ and 303′ to, respectively, the adder 200 in left channel 150 and the adder 200′ in the right channel 150′.

The voltage $V_{b1}$ applied to the base of transistor 320 is equal to the constant +12 volts at supply point 307 minus any voltage drop $V_1$ developed across resistor 309 by the operation of phase splitter stage 305. Analogously, the voltage $V_{b2}$ applied to the base of transistor 321 is equal to the constant +12 volts at supply point 307 minus any voltage drop $V_2$ developed across resistor 315 by the operation of phase splitter stage 306. Selector stage 301′ is a maximum voltage selector device in the sense that the output on lead 326 corresponds to the one of voltages $V_{b1}$ and $V_{b2}$ which has the greatest positive value relative to ground. Considering stage 301′, however, as being actuated by the voltage drop signals $V_1$ and $V_2$ in respectively, resistor 309 and resistor 315, that stage acts as a selector of the minimum one of those signals because $V_{b1}$ varies inversely with $V_1$, and $V_{b2}$ varies inversely with $V_2$. Hence, if $V_1$ is lesser than $V_2$, the output on lead 326 will be locked to $V_{b1}$ and follow any variation of $V_1$, but, if $V_2$ is lesser than $V_1$, the output on lead 326 will be locked to $V_{b2}$ and will follow any variation of $V_2$.

Considering a voltage drop as a positive quantity, the output voltage on lead 326 will undergo a variation which is proportional in magnitude but opposite in direction to whichever of the drops $V_1$ and $V_2$ that output voltage is following. For example, if the output voltage is following $V_1$ and $V_1$ increases from 0 volt to 2 volts, then the voltage on lead 326 will decrease from a reference level in an amount proportional to the 2-volt change in $V_1$ to provide by such decrease a right offcenter deflection signal reflecting the change in $V_1$. That is, the magnitude of the right offcenter deflection signal will be always substantially proportional to the magnitude of whichever of the drops $V_1$ and $V_2$ which that signal is then following.

The operation as a whole of the FIG. 23 generator can be understood by first considering the response of that generator to the edge scanning situation depicted in FIG. 18. Before the slit spot 130 has moved far enough down in track 135 to intercept any part of the edge 289, the input signals $V_L$ (left half-image signal) and $V_R$ (right half-image signal) to stage 300′ are equal and have a value of, say, 0 volt. For that value of $V_L$ and $V_R$, there will be no voltage difference between leads 311 and 313′, transistor 308 will not conduct appreciably, and the voltage drop $V_1$ in resistor 309 will, practically speaking, be 0. On the other hand, the voltage difference between $V_R$ lead 313′ and the −6 volt supply point 318 will be a maximum of −6 volts to cause transistor 314 to conduct to produce a peak of 6 volts for the value of the voltage drop $V_2$ through resistor 315. Those limiting values of 0 volt and of 6 volts for the voltage drops $V_1$ and $V_2$, respectively, are indicated in FIG. 24 by the left-hand end points 330 and 331 for the shown lines 332 and 333. Those lines represent, respectively, the variation in magnitude of $V_1$ as a function of $V_R$ when $V_L$=0 volt and the variation in magnitude of $V_2$ as a function of $V_R$ when $V_L$=0 volt.

As the slit spot 130 continues to move downward (FIG. 18), it first intercepts edge 289 where the edge crosses the right margin 136 of track 135. With further downward travel of the spot, the left spot half 139 scans in left "reference" strip 138 a constantly white tone. Hence, over that interval, the $V_L$ signal remains constant at 0 volt. In the same interval, however, the right spot half 139′ scans in the "compared" strip 138′ a mixture of white and black expanses divided by slanting edge 289 such that the white expanse and the black expanse progressively decrease and increase, respectively, with movement of the spot 130 through that interval.

The phototransistor 144′ (FIG. 6) which receives the light from right spot half 139′ does not distinguish between details of different tonal value which appear within that spot half. Instead, element 144′ provides a $V_R$ signal representative of the integral of the point-to-point intensity over the area covered by spot half 139′ of the light derived from the details in that area. It follows, therefore, that, over the interval within which edge 289 crosses strip 138′, the $V_R$ signal progressively decreases from 0 volt to −6 volts. Such variation in the value of $V_R$ is represented in FIG. 24 along the horizontal ordinate in that figure.

That progressive decrease of $V_R$ corresponds to a progressive increase in the difference between $V_L$ and $V_R$ and to a progressive decrease in the difference between $V_R$ and the −6 volts at supply point 318. Hence, as $V_R$ decreases, the voltage drops $V_1$ and $V_2$ correspondingly increase and decrease, respectively, until, at the end of the mentioned interval, $V_1$ has attained a maximum value of 6 volts and $V_2$ has dropped to 0 volt (as shown at point 334).

As stated, the described variations of $V_1$ and $V_2$ as a function of $V_R$ when $V_L$ equals 0 volt are represented in FIG. 24 by the lines 332 and 333, respectively. As illustrated, those two lines intersect at a point 335 corresponding to a point 336 in the horizontal ordinate at which $V_R$ is at −3 volts, i.e., is halfway between its starting value of 0 volt and its final value of −6 volts.

As earlier explained, selector stage 301' provides on lead 326 a right offcenter deflection signal which follows in magnitude the variation of the lesser one of the signals $V_1$ and $V_2$. Hence, as the slit spot 130 moves in track 135 through the interval within which right strip 138' is crossed by the edge 289, the magnitude of the signal on lead 326 (a) first rises by following the rise in $V_1$ represented by rightward movement along the lower portion 337 of line 332, (b) then reaches a peak represented by point 335, and (c) then falls by following the fall in $V_2$ represented by rightward movement along the lower portion 338 of line 333.

In other words, the right offcenter deflection signal undergoes a triangular variation in magnitude as the slit spot 130 traverses the interval over which edge 289 crosses the "compared" strip 138'. Such triangular variation is represented in FIGS. 24 and 25 by point 330, line segment 337, point 335, line segment 338 and point 334. Because of its triangular characteristic, such variation is adapted to and does produce the shift line 290 shown in FIG. 18. The desideratum of an amount of shift at the peak of shift line 290 which is equal to half the width of strip 138' is obtained by appropriate scaling (relative to the magnitudes of the outputs at leads 302', 303') of the right offcenter deflection currents which pass through the ribbons 225, 225'.

Subsequent to the scanning by slit spot 130 of the interval of track 135 within which edge 289 crosses the "compared" strip 138', the spot 130 scans a second interval within which the edge 289 crosses the "reference" strip 138. All during that second interval, the $V_R$ signal is at −6 volts to produce a voltage difference of 0 between $V_R$ and supply point 318 to thereby maintain the voltage drop $V_2$ at 0 value. As described, however, the right offcenter deflection signal from stage 301' follows in magnitude the smaller one of the signals $V_1$ and $V_2$. During that second interval, therefore, the right offcenter deflection signal will be locked at 0 magnitude value, and there will be no shift 290.

In the edge-scanning situation represented by FIG. 19, the order of events by which the right offcenter deflection signal is generated is the reverse of the order of events described in connection with FIG. 18. That is, in FIG. 19, the slit spot 130 moves in track 135 to scan a first interval within which edge 289 is crossing "reference" strip 138 to cause a progressive average tone change from black to white in the scanned area of that strip. The simultaneously scanned area of "compared" strip 138' is constantly black in that interval. The spot 130 then scans a second interval within which strip 138 is constantly white, but within which the scanned area of strip 138' is changing in average tone from black to white. During the first interval, the $V_R$ signal remains at its minimum value of −6 volts to lock the right offcenter deflection signal at 0 magnitude value to thereby preclude the development of any shift 290 in that interval. In the second interval, the $V_R$ signal rises from −6 volts to 0 volt. That progressive rise in $V_R$ causes the $V_2$ voltage drop to change from 0 volt to 6 volts while simultaneously, the $V_1$ voltage drop changes from 6 volts to 0 volt. During that second interval, therefore, the magnitude of the right offcenter deflection signal on leads 302', 303' (a) first rises by following the rise in magnitude of $V_2$ represented by leftward movement along the lower portion 338 of line 333 (FIGS. 24 and 25), (b) then reaches the peak represented by the point 335, and (c) then falls in magnitude by following the fall in magnitude of $V_1$ represented by leftward movement along the lower portion 337 of line 332.

The right offcenter deflection signal is accordingly characterized during that second interval by a triangular variation in magnitude which, although generated by a different order of events than those occurring in connection with the FIG. 18 edge scanning, is essentially the same triangular variation as that produced by the FIG. 18 edge scanning. The signal variation which results from the FIG. 19 scanning produces the shift line 290 which is shown in that figure.

Turning now to FIG. 20, during the interval in which edge 289 crosses strip 138, that strip is constantly black to produce a minimum $V_L$ signal which locks the offcenter signal from the right offcenter generator 162' to 0 magnitude value throughout that interval. In the subsequent interval in which edge 289 crosses strip 138', the $V_R$ signal is always greater than the $V_L$ signal to block conduction through transistor 308 so as to maintain $V_1$ to 0 value to thereby continue to lock the right offcenter deflection signal at 0 magnitude value. Therefore, the right offcenter generator is disabled from producing an output signal in response to the edge scanning situation depicted in FIG. 20.

In the edge scanning situation represented in FIG. 21, generator 162' is likewise disabled from producing an output for reasons as follows. As the spot 130 scans through the interval within which edge 289 crosses strip 138, strip 138' is constantly white to produce a $V_R$ signal constantly greater than the $V_L$ signal. During that interval, therefore, transistor 308 is blocked, the $V_1$ voltage drop stays at 0, and the output signal from the generator is locked at 0 magnitude value. When spot 130 is subsequently scanning the interval within which edge 289 is crossing strip 138', the $V_R$ signal continues to be greater than the $V_L$ signal to thereby cause the generator output signal to continue to be locked at 0 magnitude value.

So far, consideration has been given only to the response (or lack of it) of right offcenter signal generator 162' to scannings of tone density edges disposed between areas which are black and white so as to yield the maximum contrast between the tones on the opposite sides of the edge. Assume, however, that, while the blacker side of edge 289 remains full black, the whiter side of that edge becomes a step grayer than the white tone represented in FIG. 18. In that instance, instead of both $V_L$ and $V_R$ being, say, 0 volt at the start of the scanning of the crossing of track 135 by edge 289, both $V_L$ and $V_R$ are now at −1 volt. The representation of the variation of $V_1$ as a function of $V_R$ then becomes a line 341 (FIG. 25) which intercepts the horizontal ordinate at a point 340 representing −1 volt for $V_R$. The line 333 representing the variation of $V_2$ as a function of $V_R$ remains, however, the same except that such line now has a left-hand starting point 342 which corresponds to −1 volt in the horizontal ordinate, and which represents a value of 5 volts in the vertical ordinate for the voltage drop $V_2$. In the considered instance, therefore, the triangular variation in the magnitude of the right offcenter deflection signal is represented in FIG. 25 by the triangle defined by the point 340, line 341, the intersection 342 of that line with line 333, the portion of line 333 to the right of point 342 and point 334. While such triangle has a lesser base than the triangle defined by points 330, 335 and 334, it does not not follow that the spacing between the end points of the resulting shift line 290 is less than that shown in FIG. 18. On the contrary, such spacing remains the same and, as before, the deflection peak occurs halfway between those end points. The only change which occurs when the lighter side of edge 289 is a step grayer than the white tone of FIG. 18 is that the amount of peak deflection is somewhat less than that which would occur in the presence of the white tone.

In FIG. 25, the triangle defined by points 350, 351 and 334 represents the variation in magnitude of the right offcenter deflection signal when the tone on the light side of edge 289 is an additional step grayer than white so that $V_L$ and $V_R$ both have initial values of −2 volts. As before, the resulting shift line 290 will have the same end points as in FIG. 18 and a peak halfway between those points, but the amount of deflection at the peak will be less than when the lighter tone is only one step grayer than white. By extrapolation, it is clear that, no matter how great the departure from white of the tone on the light side of the edge, the FIG. 23 generator will respond to edge scanning of the types represented by FIGS. 18 and 19 to produce a triangularly varying right offcenter deflection 290 over the interval within which the edge is crossing the rightward strip 138' of the scan track 135.

It should also be noted, that, if the lighter side of the edge is white but the darker side thereof is not full black, the right offcenter generator 162' will still produce a rightward offcenter deflection 290. The same is true if both the lighter side of the edge is darker than full white and the darker side of the edge is lighter than full black. Even if the gradient in tone density between the lighter and darker areas is not as sharp as that shown in FIGS. 18–21, generator 162' will produce an offcenter deflection signal.

The left offcenter signal generator 162 is the same in circuitry as the right generator 162' except in the following respects. First, in the left generator the connections of the $V_L$ and $V_R$ signals are the reverse of that shown in FIG. 23 in that $V_R$ is applied to a resistor analogous to 310 and $V_L$ is applied to the junction analogous to the junction 304 between resistors 312 and 316. Second, in the left generator 162, the amplifiers analogous to 327 and 328 are NPN-amplifiers rather than PNP-amplifiers so that the left offcenter deflection signals on leads 302, 303 (FIG. 8) are characterized by magnitude variations in a direction the reverse of that characterizing the variations in magnitude of the right offcenter deflection signals on leads 302', 303'. The operation of the left generator 162' is symmetrical with the operation of right generator 162' in the sense that the generator responds to edge scannings of the types shown in FIGS. 20 and 21 to produce the leftwardly directed deflections of the ribbon gap center 241 which are indicated in those figures, but, on the other hand, the left generator is disabled from producing any offcenter deflection in response to edge scannings of the types shown by FIGS. 18 and 19. Because, however, the respective operations of the two generators are symmetrical, the left generator 162 responds to the type of edge shown in FIG. 21 in a manner analogous to the heretofore described response of right generator 162' to the type of edge shown in FIG. 18. Consonantly, left generator responds to the type of edge shown in FIG. 20 in a manner analogous to the heretofore described response of right generator 162' to the type of edge shown in FIG. 18.

HALFTONE REPRODUCTION OF TONE DENSITY EDGES

Figure 28:
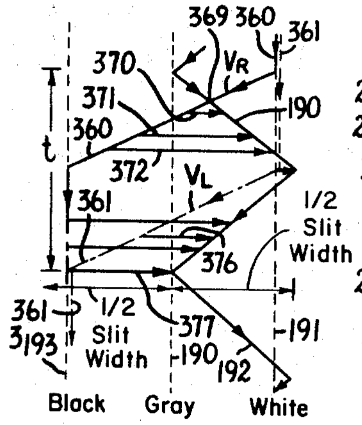
FIGS. 27–30 and 31–34 are illustrative of the mode of operation of the FIG. 2 system in the presence of the tone density edges represented by, respectively, FIGS. 18 and 19.
Figure 27:
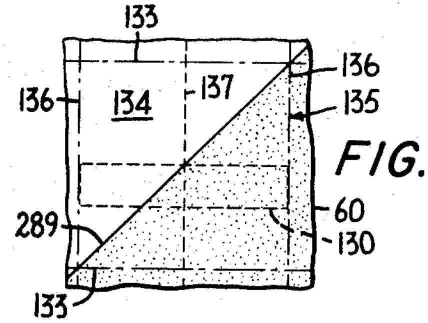
Figure 32:
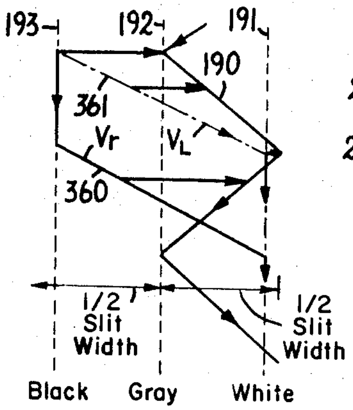
Figure 33:
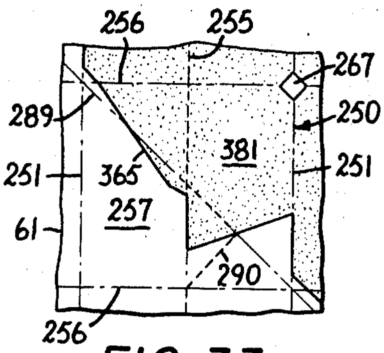
Figure 34:
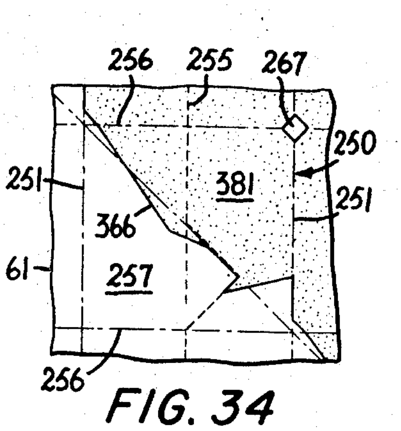

FIGS. 27–30 are related figures showing the mode of formation and the character of the halftone edge reproduced on film 61 by the described system in response to a scanning on original 60 of an edge 289 of the type shown in FIG. 18. FIG. 27 is substantially the same as FIG. 18. FIG. 28 corresponds to FIG. 9 as adapted to show by lines 360 and 361 the variation in level of, respectively, the right half-image signal $V_R$ and the left half-image signal $V_L$ as the slit spot 130 scans (FIG. 27) in track 135 over the tone density edge 289.

Figure 29:
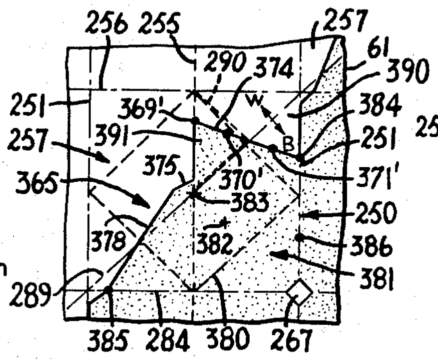

FIG. 29 shows the halftone edge 365 which would be reproduced on film 61 by the width-modulating action of the light valve ribbons 225, 225' on the exposing beam 217 if that action were to be controlled only by the $V_L$ and $V_R$ signals in main path 160 and 160' (FIG. 8), i.e., if no offcenter deflection signals were to be supplied from generator 162' to those ribbons. The same figure shows superposed on film 61 the original edge 289 as it would be if perfectly reproduced. FIG. 29 also shows by shift line 290 the offcenter deflection component corresponding to the right offcenter deflection signals from generator 162'.

Figure 30:
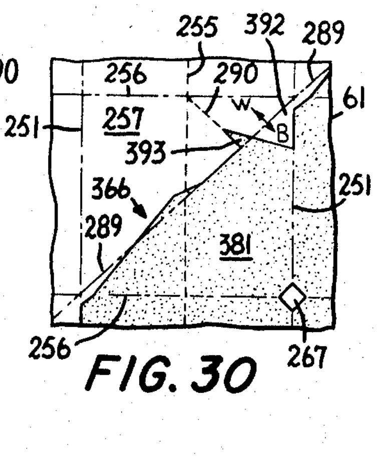

FIG. 30 carries forward FIG. 29 in that FIG. 30 shows the halftone edge 366 which is reproduced when the deflections of the ribbons are controlled both by the $V_L$ and $V_R$ signals in the main paths 160, 160' and by the right offcenter deflection signals supplied on leads 302', 303' from the right offcenter signal generator 162'.

The edge 365 of FIG. 29 is obtained graphically from the diagram of FIG. 28 in the following manner over the period $t$ of the cyclical sawtooth signal 190. As earlier described, when the level $V_R$ is greater than that of the sawtooth signal, there is no output of a right halftone dot signal from the right deflection control comparator 165'. When, however, the level $V_R$ crosses sawtooth signal at point 369 to become less than that of the sawtooth signal, the comparator 165' produces a halftone dot signal which deflects right ribbon 225' in proportion to the difference at any instant between the level of the $V_R$ signal and the magnitude of the sawtooth signal 190. The value of such difference at several instants in the first half of period $t$ are shown in FIG. 28 by the lengths of the arrows 370, 371 and 372. During that first half of period $t$, the shape of edge 365 in FIG. 29 is coincident with the locus 374 of a plurality of graph points of which each corresponds to a respective one of arrows 370–372 in that such point has the same vertical position as the corresponding arrow and is displaced rightward of centerline 255 by the length of the corresponding arrow. Thus, for example, point 369' and points 370', 371' in FIG. 29 correspond, respectively, to point 369 and arrows 370, 371 in FIG. 28. The remainder of edge 365 is obtained by the same graphical procedure as that just outlined. It might be noted that the graph point corresponding to arrow 372, for example, will lie outside scan track 250 (i.e., rightward of the right edge 251 of scan track 250) because the ribbon deflection represented by arrow 372 is enough to drive the central portion 230' of ribbon 225' outwardly of the right end of aperture slit 223 (FIG. 12b).

In the initial half of period $t$, the $V_R$ signal until the very end is greater in level than the sawtooth signal 190. Hence, during most of that half period, left ribbon 225 will remain undeflected. Even so, the ribbon gap center 241 will be deflected rightward of the aperture slit center 242 by half the width of the deflection of the central portion 230' of right ribbon 225' from aperture slit center 242, i.e., by half the width of the ribbon gap 240.

Thus, it is possible to produce an offcenter deflection (as that term has heretofore been defined) without the aid of any offcenter deflection signals from the appropriate one of the generators 162, 162'. That such can be done stems from the fact that the left and right valve ribbons are independently controlled by separate half-image signals derived from, respectively, the left and right sides of the scan track 135. An explanation of such offcenter deflection produced by the half-image signals alone is provided by analyzing the total deflection of each ribbon into oncenter and offcenter components. In the left ribbon, the two components are equal but opposite in direction to yield a total deflection of 0 for the left ribbon. In the right ribbon, however, the two components are equal and in the same direction to be additive. Because both types of component are virtually present, they produce both an oncenter deflection of the ribbons symmetrically about the ribbon gap center 241 and an asymmetrical offcenter deflection of such gap center relative to slit center 242 even though the total deflection of the left ribbon 225 is 0.

During a short interval at the end of the first half of period $t$, the sawtooth signal 190 exceeds for the first time the level of the $V_L$ signal 361. Hence, during that short interval, the left ribbon 225 starts to move leftwardly as indicated by the shown portion 375 of edge 365 (FIG. 29).

During most of the second half of period $t$, the instantaneous level of sawtooth signal 190 is much in excess of the level of the $V_R$ signal 360, wherefore right ribbon 225' is deflected outward of the right end of aperture slit 223 for all of that half period except at its very end when the right ribbon moves far enough inward to form the upper left-hand edge of the small white void 267. In the same half period, the difference in voltage between the sawtooth signal and the $V_L$ signal is characterized by a progressive linear increase indicated by the progressively increasing lengths of arrows 376, 377 (FIG. 28). During that second half of period $t$ therefore, the reproduced edge 365 is characterized by a leftwardly running straight line portion 378.

The shape of edge 365 within the fully shown halftone dot zone 257 is, of course, repeated in the zones 257 diagonally above and below the fully shown zone.

FIG. 29 indicates by dotted line 280 the size and shape of the black diamond-shaped halftone dot which would have been produced in zone 257 either by a halftone screen in response to scanning of the edge shown in FIG. 27, or, alternatively, by the described system in response to the scanning of a uniform intermediate gray tone (FIGS. 15*a* and 15*b*). The dot 381 actually produced by the described system in response to the scanning of the original edge 289 of FIG. 27 (and in the absence of offcenter deflection signals from generator 162′) will differ from dot 380 in the following respects. First, the center of area 382 of dot 380 (and zone 257), will be displaced from its normal position on centerline 255 such displacement being in the direction towards the dark side of the edge line 289. As shown by FIGS. 1*a*–1*c*, the centers of area of dots produced by the halftone screen method are always disposed in a regular pattern so as to be at the intersections of a grid work formed of a first set of equally spaced parallel lines and a second set of equally spaced parallel lines normal to the first set. The effect, therefor, on the described system of the sensing on the original of a gradient in tone density (of which an edge is the limiting case) is to shift the centers of area of the reproduced halftone dots towards the black side of the gradient and away from the positions those centers would occupy in the standard gridiron pattern for such centers.

As a second difference, in FIG. 29 the actually formed dot 381 has been modified from the diamond shape characterizing 380 to a roughly triangular-shaped dot which is concentrated in the lower right diagonal half of zone 257. One of the principal features of such modification is that, as compared to dot 380, dot 381 has been elongated in the direction of the contour of the original tone density gradient so as to have in that direction a longer maximum dimension (between points 384 and 385) than the maximum dimension of the spot (between points 369′ and 386) in the direction of the gradient, i.e., in the direction normal to edge 289. By virtue of so being elongated and of providing a reproduced edge segment 365 in zone 257 with the same overall trend in direction as edge 289 the reproduced segment 365 tends, as seen by the eye, to "join up" with the corresponding reproduced edge segments in the halftone dot zones diagonally above and below the fully shown zone 257 so as to give an unbroken appearance to that succession of edge segments.

Hence, the described change in shape of dot 381 together with the shifting of the center of area of that dot serve to provide a reproduced edge 365 which well approximates the ideal edge 289. While the reproduced edge 365 does not conform exactly to the ideal edge, the conformity is much better than that which would be provided by dot 380. On a larger scale, the reproduced edge 365 conforms much more closely to the ideally reproduced edge than does the jagged boundary between white and black which (FIG. 17) results when a tone density edge on the original is reproduced by halftone screen methods. That is, the reproduced edge 365 will, to the eye, have a sharp crisp appearance much like original edge 289 (FIG. 27) rather than the fuzzy appearance afforded by the jagged boundary illustrated in FIG. 17.

It is to be noted that, in the absence of the right offcenter deflection signals from generator 162′, the reproduced edge 365 (FIG. 29) has a rather pronounced bay 390 and adjacent jut 391. The effect of combining the right offcenter deflection signals with the $V_L$ and $V_R$ signals in the main deflection paths 160 and 160′ (FIG. 8) is shown in FIG. 30. That halftone dot of that figure is obtained graphically from FIG. 29 by adding to the transverse displacement of edge 365 from centerline 255 the displacement which is represented by the shift line 290. As shown by FIG. 30, the reproduced edge 366 conjointly resulting from the $V_L$ and $V_R$ signals and from the right offcenter deflection signals is an edge in which the bay 390 has been reduced to a much smaller bay 392, and in which the jut 391 has been reduced to a much smaller sized jut 393. Edge 366 is, therefore, an even smoother halftone reproduction of the original edge 389 (FIG. 27) than is the edge 365 of FIG. 29.

Figure 31:
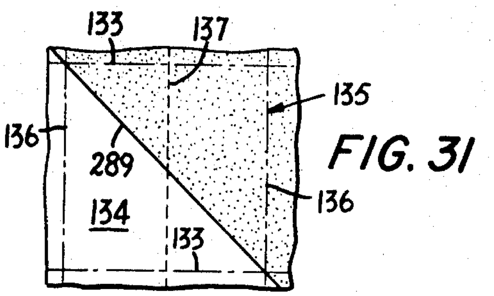

FIGS. 31–34 are related figures showing the character of the halftone edge reproduced by the described system when scanning the original edge represented by FIG. 31 which is essentially the same as FIG. 19. Because FIGS. 31–34 are respectively similar to FIGS. 27–30 except for the differences caused by the scanning of an edge (FIG. 31) whose darker and lighter sides are reversed in position relative to the darker and lighter sides of the FIG. 27 edge, there is not need to describe FIGS. 31–34 in detail. Those last-named figures show, however, that the described system is as effective in smoothening a reproduced halftone edge in the case of a scanned original edge of the type shown in FIG. 19 and 31 as in the case of a scanned original edge of the type shown in FIGS. 18 and 27. Moreover, the system is equally effective in smoothening halftone edges reproduced from scanned original edges of the type shown by FIGS. 20 and 21 because the latter types of edges are merely left-hand versions of the edge types shown in FIGS. 18 and 19, and the operation of the system for such left-hand edge types is symmetrical with its operation for the right-hand edge types of FIGS. 18 and 19.

MODIFICATIONS AND ALTERNATIVES

Having fully described one specific exemplary embodiment of the invention, attention is now drawn to various ways by which that embodiment can be modified and to various other ways by which the invention can be practiced.

In lieu of scanning an original 60 which is a positive, the FIG. 2 system may be adapted to scan a negative 60 by including in each of range and level control units 158 and 158′ a stage which effects in each of channels 150, 150′ an inversion between greater and lesser magnitude values (relative to a reference level) of the half-image signal in that channel and the tone density values which are respectively represented by those greater and lesser magnitude values. That is, in the FIG. 2 system as previously described, magnitude values of each half-image signal which are greater and lesser relative to the signal level for reference "black" are representative of, respectively, a relatively lighter tone and a relatively darker tone. That relationship is changed by the inverter stage so that such greater and lesser magnitude values become representative of, respectively, a relatively darker tone and a relatively darker tone.

When the signals in the FIG. 2 system are linearly related in magnitude value to the tone densities scanned on a negative original, each of the mentioned left and right inverter stages is provided with a nonlinear transfer characteristic to compensate for the logarithmic relationship on negative 60 between the tone densities of the negative image and the light intensities which produced those tone densities. When, however, there is a logarithmic relationship in the FIG. 2 system between the tone densities scanned on the negative original and the magnitude values of the resulting signals, such nonlinear transfer characteristic is not necessary.

Whether the FIG. 2 system scans a positive 60 as first described or, alternatively, that system is modified to scan a negative 60 by incorporating in the system the mentioned inverter stages, the resulting halftone image on film 61 will be a positive. It is to be understood, however, that the invention hereof is not limited to the making of only a positive but extends also to the making of a negative on the film 61 or another image-receptive member. Further, the invention extends to applications where for the purpose say, of making a negative, the formation of the halftone dots on the image-receptive member is controlled by signals derived from the original and transmitted through three or more channels.

As another consideration, while the FIG. 2 system has been described as one which provides a 1.1 size relation between the image on original 60 and the half tone reproduced on film 61, any desired size relation between the original image and the halftone reproduction thereof can be realized by synchronizing the signal from bar scanner 56 with the scannings of original 60 and reproduction sheet 61 in a manner as follows.

Assume that the desired fineness for the half tone on sheet 61 is $1/w_3$ lines per inch (e.g., 100 lines per inch) so that the spacing between lines is $w_3$ inch (e.g., 10/1,000 inch). Then the axial displacement per step of recorder 63 relative to film 61 is set equal to $w_3$, and recorder 63 is adjusted to yield on film 61 a slit spot 220 having a width of about $w_3$ when of full width.

Assume further that the cyclical signal from bar scanner 56 (or other source is a periodic signal having a constant value $t$ for each period thereof. Then, the cyclical signal graduates each scan track 250 scanned over film 61 by slit spot 130 into length intervals $d_3$ given by the relation:

$$t=(d_3/S_3) \quad (2)$$

where $S_3$ is the linear speed of movement of film 61 past recorder 63. In order, however, for such intervals to provide square half-tone dot zones 257 in each scan track 250, $d_3$ must equal $w_3$, and accordingly, it is necessary that:

$$t=(W_3/S_3) \quad (2)$$

Assume it is desired that the half-tone image on film 61 be $k$ times the size of the image on original 60 where $k$ is any selected number either lesser or greater than 1. It follows that the axial displacement per step of scanner 62 relative to original 60 is $w_2$ where $kw_2$ equals $w_3$, and that the optics of scanner 62 is adjusted to yield a width of $w_2$ for the slit spot 130. It also follows that the cyclical signal from bar scanner 56 (or other source) is required to graduate each scan track 135 scanned over original 60 by slit spot 130 into intervals each of length $d_2$ equal to $w_2$ in order to provide square half-tone dot zones 134 in that scan track. That requirement is expressed by the relations:

$$t=(w_2/S_2)=(w_3/S_3) \quad (3)$$

$$kw_2=w_3 \quad (4)$$

$$Ks_2=S_3 \quad (5)$$

where $S_2$ is the speed of linear movement of original 60 past scanner 62.

The relations just set forth are satisfied by the scanner apparatus disclosed in U.S. Pat. No. 3,109,888 (issued Nov. 5, 1963 in the name of William West Moe) wherein the film for the reproduction is mounted on a rotating drum, but the original is mounted on a frame which reciprocates relative to a scanner to produce a scanning of the original by a light beam. Hence, the apparatus disclosed in that patent may be used in the practice of the present invention.

The period $t$ of the cyclical signal is given by the expression:

$$t=(d_1/S_1) \quad (6)$$

where $d_1$ is the combined width (in the scanning direction) of one black and one white bar on film strip 50, and $S_1$ is the linear speed of movement of that strip past scanner 56. Hence, the expression which fully relates the required synchronous relations in respect to speed between the scannings of the strip 50, original 60 and film 61 is $(d_1/S_1)=t=(w_2/S_2)=w_3/S_3) \quad (7)$ with expression (7) being subject to the constraints set out by expressions (4) and (5).

Examining (7), the term $w_3$ is a constant of selected value and, from (4), the term $w_2$ is also a constant of a value determined by the value selected for the size relation coefficient $k$. The quantities $S_2$ and $S_3$ can and may vary so long as their respective variations are synchronized in accordance with expression (5). When $S_2$ and $S_3$ so vary, expression (7) requires that $t$ vary synchronously with but inversely with S2 and S3. That is the period $t$ of the cyclical signal should be synchronized with the speeds $S_2$ and $S_3$ of scanning of the original 60 and film 61.

Theoretically $d_1$ may be variable and $S_1$ may be variable and nonsynchronized with $S_2$ and $S_3$ so long as the ratio $d_1/S_1$ equals $t$. A convenient way of satisfying (7), however, is to have $d_1$ a constant and to have $S_1$ synchronized in speed with $S_2$ and $S_3$ (as is done in the FIG. 2 system).

In order for the halftone dot zones in the patterns scanned over positive 60 and film 61 to line up horizontally as well as vertically (as they do in the FIG. 2 system), it is further necessary to have synchronization in space phase between $t$ and the scannings of original 60 and film 61. Assume that the beginning of a line or track scanning cycle for the original 60 occurs at the instant of positioning of a reference datum or mark for the original in the center of the scanning zone for 60, and that the beginning of a line or track scanning cycle for the film 61 likewise occurs at the instant of positioning of a reference mark or datum for the film at the center of the scanning zone for the film. In that instance, a space phase synchronization between the scannings of the original and film is obtained when the respective marks for the original and film are always simultaneously positioned at the centers of their respectively corresponding scanning zones. With the scannings of the original and film being so synchronized in space phase, the cyclical signal from bar scanner 56 is synchronized in space phase with those scannings when the beginning of each line or track scanning cycle for the original and the film coincides with a phase value of the cyclical signal which remains constant from scanning cycle to scanning cycle.

In connection with the foregoing, it should be pointed out that there are applications of the invention, in which, to minimize moire or other visible pattern effects in the reproduced halftone image, it may be desirable to depart from close synchronization in space phase and speed between the quantities $t$, $S_2$ and $S_3$. Such departure may be effected in various ways as, for example, varying the space phase and speed relation between those quantities either in a predetermined manner or in a random manner, or, alternatively, rendering the mentioned cyclical signal aperiodic either in a predetermined manner or in a random manner. A departure produced in one of the ways described will produce a shift in the scanning direction of the centers of area of the formed halftone dots away from standardized locations for such centers even when a uniform tone is being scanned on the original. Moreover, like techniques may be used when scanning a uniform tone to produce a shifting crosswise of the scanning direction of the centers of area of formed halftone dots relative to standardized locations for such centers.

It should be noted that there are applications of the invention in which the time phasing of the mentioned cyclical signal may be correlated with the scannings of the original and film so that the halftone dots in adjacent scan tracks over the film are progressively shifted in space-phasing relative to a reference datum for the dots in the tracks. By so shifting the space phase of dots in adjacent tracks, the crosswise rows formed by such dots will be at an angle other than 90 ° to the vertical columns formed by the dots in each scan track.

If it is desired to produce halftone images having a screen angle other than 90°, this can be done easily with the FIG. 2 system by simply mounting both the original 60 and the film 61 on their respective drums at the desired screen angle relative to a line on the drum which is parallel to the axis thereof.

The original image on sheet 60 (FIG. 2) is so called because it is the graphic image originally scanned for the purpose of producing the halftone reproduction. Evidently, however, what is designated herein as the "original image" may itself be a reproduction of one or more predecessor images. Moreover, the original image need not be a photographic image but may be a light image derived from direct viewing of a subject (as in "live" television), a magnetic image, etc.

Likewise, the member on which the halftone image is formed need not be a photographic film but may be any suitable member adapted to have a latent or finished image impressed thereon. Thus, for example, such member may be a photoresist or other printing plate blank which is sensitized to receive an image.

The image-forming agency need not, of course, be visible light but may be any stimulus emanated by the recording means and adapted to form an image on an appropriate member. Thus, it is consonant with the present invention for the image to be formed by infrared, ultraviolet or other forms of electromagnetic radiation apart from visible light, elementary particle radiation such as electron beams, beams of acoustic wave energy and magnetic flux.

The bar scanner 56 of FIG. 2 may be replaced by another source of a cyclical signal such as, for example, an oscillator closely or loosely synchronized in operation with the scannings of the original and of the member on which the halftone image is formed. In lieu of scanning the original 60 in the manner heretofore described, other scanning techniques may be employed, as, for example, line scanning or raster scanning effected by cathode-ray tube means and characterized by the feature that one or both of the scanning motions are produced electronically. Also, the sensing of a tone density gradient in the original may be performed in ways other than by the dual scanning method which has been specifically described herein.

FURTHER APPLICATIONS OF THE SYSTEM

Figure 37:
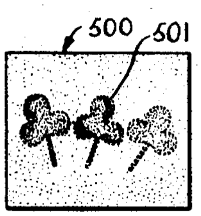
FIGS. 37–41 show examples of copy reproducible by the FIG. 2 system.

FIGS. 37–41 are representations of various kinds of original copy which may be required to be reproduced by scanning systems of the sort described. The copy of FIG. 37 is a full-tone picture 500 characterized by a variety of intermediate tones in the scale from black to white. As is well known, such a graduated tone picture must be converted into half tone in order to be reproduced by ink printing.

Figure 38:
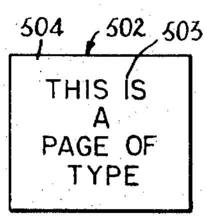

The copy of FIG. 38 is, on the other hand, a full-tone copy 502 comprised of letters of dark or black uniformly toned type 503 on a light or white uniformly toned contrasting background 504.

When type 503 is reproduced in half tone by the disclosed system, the resulting reproduction by halftone dots of the tone density edges formed by type 503 and background 504 are edges which are smoothed in the manner earlier described in connection with FIGS. 27–34. Accordingly, the type 503 as reproduced in half tone by the present system is much improved in appearance compared to half tone reproduction of type by prior art methods. In fact, the improvement is so great that halftone reproduction of type which would be illegible by any prior art method becomes quite legible by the halftone dot, edge-smoothing technique provided by the present system.

In the ink printing of magazines, newspapers and like media, it is usually required that copy of the sort shown in FIG. 38 (i.e., type matter and a background therefor) be reproduced in full tone. The described system is adapted to provide such full-tone reproduction in a manner as follows.

Figure 42:
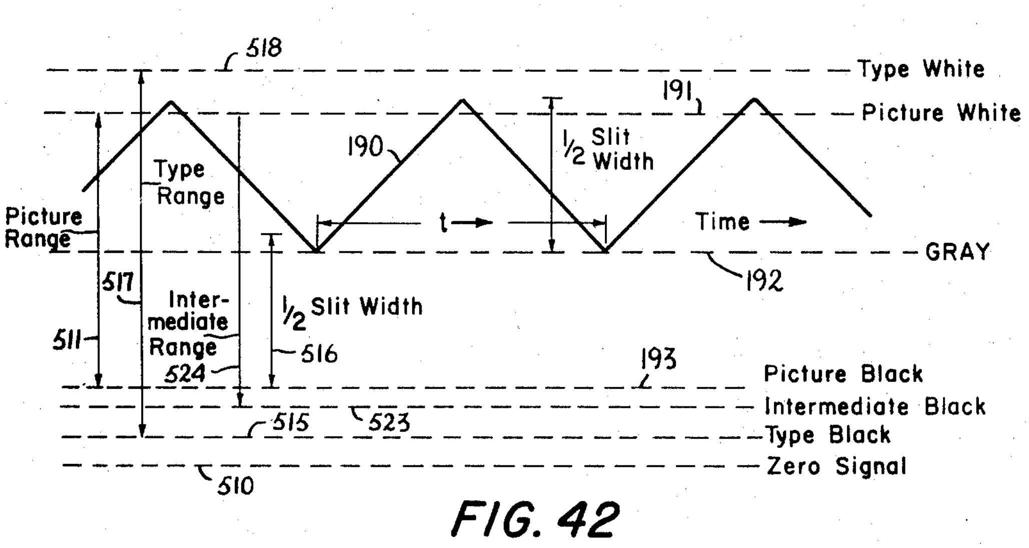
FIG. 42 is a modification of the diagram of FIG. 9.

Referring to FIG. 42 (which is a modification of FIG. 9), it will be recalled that for reproduction of a picture (FIG. 37) or other graduated tone image, the width of the halftone dots exposed on film 61 is a function of the difference between the instantaneous magnitude of the sawtooth wave 190 and the concurrent instantaneous magnitude of the image signal. The latter magnitude may vary between a white level 191 (representing maximum highlight) and a black level 193 (representing maximum shadow). Such reference levels are established by the range and level control units 158 and 158' (FIG. 8) of which each is adjusted for each particular scanned "picture" original such that the resulting image signal attains levels 191 and 193 when the tones scanned on the original are, respectively, its lightest tone and its darkest tone.

More specifically, independent level and gain adjustments are made to units 158 and 158' such that, at the outputs of those units, the image signal magnitude resulting from scanning of the darkest tone is at level 193 above the zero signal level 510, and the image signal magnitude resulting from scanning of tone values distributed from the scanned darkest tone to the scanned lightest tone are correspondingly distributed along an image signal magnitude or tone range 511 extending from level 193 to level 191. After such level and such gain adjustments have been made for a graduated tone original such as copy 500 (FIG. 37), the scanning of the lightest tone, and intermediate tones and the darkest tone on the original will cause the exposure on film 61 (in the way heretofore described) of, respectively, a pattern of pinpoint black dots 260 in a white field 258 (FIG. 14*a*), a pattern of intermediate size black dots 263 interspersed with white voids 264 of about the same size (FIG. 15) and a pattern of large size black dots 266 interspersed with small white voids 267 (FIG. 16*a*).

Coming now to reproductions of type on a contrasting background as exemplified by copy 502 (FIG. 38), a full-tone reproduction of such copy material is attainable with the described system by resetting the range and level units 158, 158' as follows. First, the level adjustment control is reset such that the image signal derived from the scanning of the black areas of type 503 has a magnitude at a low level 515. Such "-type" black level 515 is sufficiently below the "picture" black level 193 that the actual instantaneous difference between level 515 and sawtooth wave 190 is always greater than the value 516 for such difference which is required to deflect each of the ribbons 225, 225' of the light valve away from the center 242 of the valve slit aperture 223 by an amount equal to one half the slit width. The result, therefore, of the resetting of the black level for the image signal is that ribbons 225, 225' will be held outwardly of slit 223 all during the scanning of a uniform tone area provided by the type matter 503 to thereby cause (a) exposure on film 61 of black dots which completely fill the dot zones 257, and (b) consequent elimination of any white voids between those black dots. That is, scanned areas of the copy which are type areas unmixed with any background will be reproduced black and be in full tone.

A further adjustment is that of increasing the gain of the image signal in units 158 and 158' to cause the range 517 of variation of image signal magnitude above the level 515 to extend to a highlight level 518 above the peaks of the sawtooth wave 190 and attained by the image signal when scanning the light background 504 for the type 503. From the foregoing description of the operation of light valve 100, it will be apparent that the driving of the image signal to level 518 by the scanning of a uniform tone background area will cause complete blockage by valve 100 of the exposing beam 217 and, consequently, a reproduction of that scanned area entirely by white spaces which are voids in relation to the dots by which the type matter is reproduced. Hence, scanned areas of the copy 502 which are background areas unmixed with any type area will be reproduced white and in full tone.

If an unsplit image signal were to be derived from the analyzing light beam which scans the original, a tone density edge between the type matter 503 and the background 504 would tend to be reproduced in half tone because the beam in crossing the edge would see both black and white and would, therefore, generate a "grey" image signal. Because, however, the image signal is split as described into the previously mentioned left and right half image signals and because, further, of the use of the earlier described left and right off-center deflection signals, any such reproduced tone density edge will be smoothened in the manner represented by FIGS. 27–34 to be substantially as regular and as sharp as a reproduced edge formed by type setting. Thus, the described system is adapted to produce reproduction in full tone even at edges shared by the type matter 503 and the background 504.

In some types of ink printing (e.g., letterpress printing), it is preferred that residual or pinpoint halftone dots be retained in background 504 for the type matter. For such kinds of printing, the gain provided for the image signal by units 158 and 158' may be adjusted such that the image signal magnitude attains only level 191 in response to scannings of areas consisting entirely of the background 504. With such gain adjustment, the reproduced background will include pinpoint dots for the reasons heretofore described in connection with FIGS. 14*a* and 14*b*.

Figure 39:
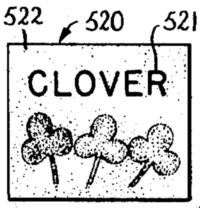

Often, the original to be reproduced is of the sort represented by the copy 520 of FIG. 39 wherein type matter 521 has a graduated tone background 522 provided by, say, a picture, and wherein the tone of the type matter is darker than any of the tones of the background. In such instances, units 158 and 158′ may be adjusted in respect to level to establish for the image signal an intermediate black level 523 attained by the image signal magnitude during scanning of the type matter 521 and separated from the nodes of the sawtooth wave 190 by an amount equal to or slightly greater than the critical difference value 516. Also, units 158 and 158′ may be concurrently adjusted in respect to gain such that the range 524 of magnitude variation of the image signal above level 523 extends from that level to the "picture" white level 191. With such mode of adjustment, the dark type matter 521 will be reproduced in full tone (for the reasons described in connection with FIG. 38) whereas all of the graduated tones of background 522 will be reproduced in half tone under the condition that the image signal magnitude derived from the scanning of the darkest of such tones is separated from the nodes of sawtooth wave 190 by a difference which is less than the critical difference 516.

While the use of intermediate black level 523 and intermediate signal range 524 provides good results in many instances of copy characterized by both type matter and graduated tones, such intermediate mode of adjustment has certain disadvantages as follows. First, if the darkest tone of the graduated tone background 522 should approach too closely the blackness of the type 521, then such darkest background tone may be reproduced in full tone rather than in half tone as desired. Also, since the intermediate signal range 524 is somewhat greater than the picture range 511, the tone scale of the graduated picture tones in the reproduction may be distorted from optimum in that reproduced shadow tones may appear darker than is ideal.

Figure 39A:
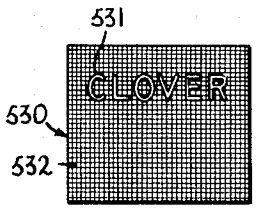

Those disadvantages in reproducing mixed type and graduated tones by the described intermediate or "I" mode of adjustment may, however, be overcome by an automatic or "A" mode of adjustment characterized by switching between the "-type only" or "T" mode of adjustment and the "picture only" or "P" mode of adjustment under the control of the mask 530 shown in FIG. 39*a*. In that mask, the type matter of 521 of copy 520 is duplicated by the substantially transparent lettering 531, and the background 522 of copy 520 is duplicated by the substantially opaque field 523. In operation, mask 530 is scanned synchronously with copy 520 (by means later described) to produce a mask signal characterized by high and low levels upon the scanning of, respectively, the light and dark tones provided by, respectively, lettering 531 and field 532. Those different levels of the mask signal are utilized in turn (by means later described) to switch the adjustment of units 158,158′ from the "picture" mode of adjustment characterized by levels 191, 193 at opposite ends of signal range 511 to the "type" mode of adjustment characterized by the levels 515 and 518 at opposite ends of the larger signal range 517.

Figure 40:
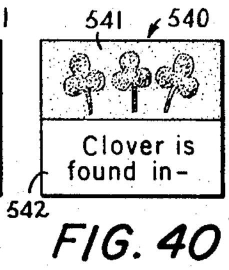
Figure 40A:
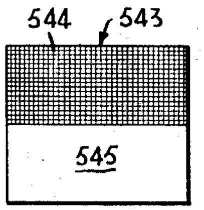

FIG. 40 represents another form of copy 540 subdivided into a picture area 541 and a type-and-background area 542. Copy 540 is well adapted to be reproduced by automatic switching of the tone scale of the image signal between the described "picture" adjustment (used here for reproducing area 541) and the described "type" adjustment (used here for reproducing area 542). Automatic switching is effected under the control of mask 543 (FIG. 40*a*) subdivided into opaque and transparent areas 544 and 545 corresponding to, respectively, the areas 541 and 542 on the original.

Figure 41:
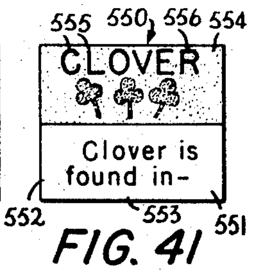

FIG. 41 represents still another sort of copy 550 well adapted to be reproduced by the mentioned automatic switching technique. Copy 550 is subdivided into (a) an area 551 of uniform-tone black type 552 on a uniform-tone white background 553, (b) a graduated tone area 554 which may be, say, a picture, and (c) an area (or areas) 555 formed by uniform-tone black lettering or type 556 standing out against the graduated tone background provided by area 554.

Figure 41A:
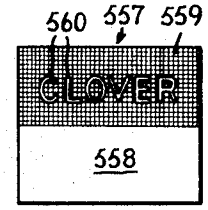

The mask 557 (FIG. 41*a*) used in connection with copy 550 is subdivided into transparent area 558, opaque area 559 and transparent areas 560 corresponding to, respectively, the areas 551, 554 and 555 of the original copy. When either transparent areas 560 or transparent area 558 of the mask 557 are scanned, the resulting mask signal is characterized by a high level which adjusts the image signal to produce full-tone reproduction of either the darkest tone or the lightest tone in the corresponding area then being scanned on original copy 550. In the case of the all-black areas 555, the capability of the image signal to produce full tone reproduction of "white" is, of course, superfluous. In the case of the type-and-background area 551, however, such capability is employed to effect full tone reproduction of both the black type matter 552 and its background 553. The described transparent-opaque coding of mask 557 is, thus, versatile in that the transparent areas thereon can command full tone reproduction of areas on the original 550 which are either (1) all black or (2) all white or (3) mixed maximum black and maximum white. Similarly, an opaque area 559 on mask 557 is versatile because it can command reproduction in half tone of the corresponding area on the original whatever may be the darkest tone value or the lightest tone value of the range of tone values which appear in that area of the original.

Figure 43:
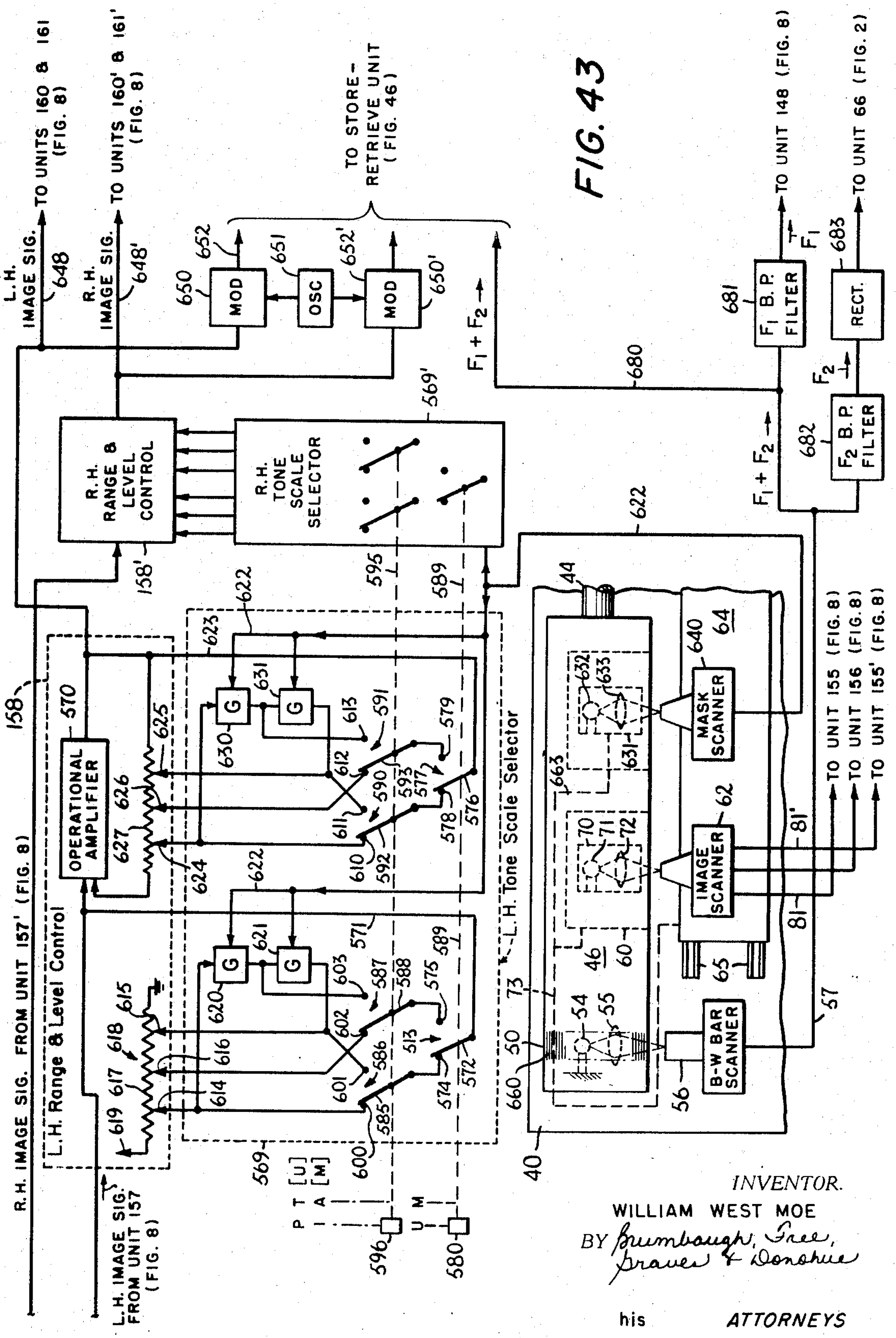
FIG. 43 is a part-schematic part-block diagram of a modification of the system shown by FIGS. 2 and 8.

FIG. 43 is a diagram of the system of FIGS. 2 and 8 as modified to incorporate improvements including left and right tone scale selector units 569 and 569′ coupled to, respectively, the range and level control units 158 and 158′ to control the tone scale of the image signal provided by those units. Since unit 569 is substantially a duplicate of the unit 569′, only the unit 569 will be described in detail.

The left-tone scale selector unit 569 is utilized in conjunction with a range and level control unit 158 in the form of an operational amplifier 570 for the left half-image signal received from unit 157 of the FIG. 8 system. To such signal from unit 157, there is added a DC level applied to the input of amplifier 570 from an output lead 571 for the selector unit 569. That DC level is derived by unit 569 in a manner as follows.

Lead 571 is connected to a movable contact 572 in a "lower deck" double-throw switch 573 having fixed left and right contacts 574 and 575. The contact 572 of switch 573 is mechanically ganged by a linkage 589 with the movable contact 576 of another "lower deck" double-throw switch 577 having left and right fixed contacts 578 and 579. Linkage 589 has thereon a button or handle 580 which may be manually pulled out to "U" position or pushed in to "M" position to thereby throw both of movable contacts 572 and 576 to, respectively, the left and right. The symbols "U" and "M" stand for "unmixed" and "mixed". The "U" position is used when the copy to be scanned is "unmixed" as between type matter and picture matter in that it is either a "P" copy consisting entirely of graduated tones (FIG. 37) or is a "T" copy consisting entirely of uniform-tone type and background (FIG. 38). The "M" position is used when the original copy is "mixed" in that it consists in part of graduated tones and in part of type either on a uniform-tone background or on a graduated tone background (FIGS. 39–41).

The left fixed contact 574 of switch 573 is connected to a movable contact 585 of an "upper deck" double-throw switch 586 paired with another "upper deck" double-throw switch 587 so that switch 586 is the left-hand switch in that pair. The right-hand fixed contact 575 of switch 573 is coupled to the movable contact 588 of the switch 587. Associated with the pair of switches 586 and 587 is another pair of left and right "upper deck" double-throw switches 590 and 591 having respective removable contacts 592 and 593 coupled to, respectively, the left fixed contact 578 and the right fixed contact 579 of the "lower deck" switch 577. The movable contacts of all four of the upper deck switches are mechanically ganged together by a linkage 595 adapted to be manually shifted by button or handle 596 to "out" and "in" positions at which the movable contacts of the upper deck switches are all thrown to, respectively, the left and the right.

Movable contact 585 of "upper deck" switch 586 is adapted to close with either a left fixed contact 600 or a right fixed contact 601. Similarly, movable contact 588 of "upper deck" switch 587 is adapted to close with either a left fixed contact 602 or a right fixed contact 603. In the other pair of "upper deck" double-throw switches 590, 591, movable contact 592 is adapted to close with either a left fixed contact 610 or right fixed contact 611, and movable contact 593 is adapted to close with either a left fixed contact 612 or a right fixed contact 613. Thus, each of the four possible combinations of "in" and "out" positions of buttons 596 and 580 will result in connection of lead 571 through selected ones of the described switches to a different one of contacts 601–603 and in connection of lead 623 (coupled to movable contact 576) through selected ones of the described switches to a different one of the contacts 610–613. The last-named contacts are each paired in order with a respective one of the contacts 601–603. That is, when lead 571 is coupled to contact 600, lead 623 is coupled to contact 610 and so on.

Fixed contacts 600, 601 and 602 are respectively coupled to separate taps 614, 615 and 616 contacting as shown the winding 617 of a level-adjusting potentiometer 618, and each being independently adjustable in position along that winding. Winding 617 is connected between ground and a positive voltage supply 619 such that taps 614 and 615 are nearest to and farthest from, respectively, the source 619, the tap 616 being disposed intermediate the other two taps. Fixed contact 603 is operably coupled either through a gate circuit 620 (when closed) to tap 614 or through a gate circuit 621 (when closed) to the tap 615. Gate circuits 620 and 621 are controlled by a masking signal on lead 622 in a manner such that circuits 620 and 621 are open and closed, respectively, when such signal is of low level and closed and open, respectively, when such signal is of high level.

Because the taps 614, 616 and 615 are closest in the order named to the positive voltage source 619, the operation of selector unit 569 to connect the input of amplifier 570 through selected ones of the switches to one after another of those taps (in the order named) will impart to the left half image signal a relatively high DC level derived from tap 614, a relatively low DC level derived from tap 615 and an intermediate DC level derived from tap 616. Each of those levels is subject to independent adjustment in value by adjustment of the position along winding 617 of the corresponding tap. Hence, the FIG. 43 system is adapted through unit 569 to provide for the half image signal passed through amplifier 570 any one of three DC levels which are relative high, relatively low and of intermediate value respectively and which correspond in value to, respectively, the picture black level 193, the type black level 515 and the intermediate black level 523 (FIG. 42).

In analogous manner to the connections on the left-hand side of unit 569, the fixed contacts 610, 611 and 612 on the right-hand side are respectively coupled to taps 624, 625 and 626 contacting as shown a potentiometer winding 627 and each independently adjustable in position along that winding. The winding 627 is inserted into the negative feedback path for operational amplifier 570 with the right-hand end of winding 627 being coupled to lead 623. Each of taps 624–626 when coupled through selected ones of the described switches to lead 623 serves to shunt out of such feedback path the portion of winding 627 to the right of the tap to thereby decrease the total resistance in the feedback path. Since, however, that path provides negative feedback, a decrease of resistance in the path corresponds to a decrease in the gain of amplifier 570. Therefore, taps 624, 625 and 626 when switched one after another to lead 615 will provide in the order named a relatively low value, a relatively high value and an intermediate value for the gain experienced by the left half image signal in passing through amplifier 570. Hence, by appropriately adjusting the positions of taps 624–626 along the winding 627, such relatively low, high and intermediate values of gain may be rendered such as to provide, respectively, the relatively small picture range 511, the relatively large type range 517 and the intermediate range 524 which are shown in FIG. 42 as being different tonal ranges for the image signal. Note that such ranges 511, 517 and 524 will be selected by unit 569 simultaneously with the selection by that unit of, respectively, the picture black level 193, type black level 515 and intermediate level 523.

The remaining upper deck fixed contact 613 on the right-hand side of unit 569 is connected either through a gate circuit 630 (when closed) to tap 624 or through a gate circuit 631 (when closed) to the tap 625. Gate circuits 630 and 631 are controlled by the masking signal on lead 622 in a manner such that circuits 630 and 631 are closed and open, respectively, when such signal is of low level and are open and closed, respectively, when such signal is of high level.

The mentioned masking signal is developed in the following manner. The transparent drum 46 of the FIG. 2 system is axially elongated (FIG. 43) to provide room thereon for a mask 630 of the type described in connections with FIGS. **39*a*–41*a* and characterized by opaque and transparent tone areas matched to areas on original 60 which are, respectively, graduated tone areas and areas of type or of type plus uniform-tone background. The mask 630 is mounted on drum 46 in circumferential registration with original 60 and is scanned in a raster pattern identical with that by which the original is scanned. To the end of effecting such scanning of the mask, an auxiliary "periscope" light projector 631 (represented schematically by light source 632 and lens 633) is coupled by linkage 73 to scanner carriage 64 to move axially within drum 46 in correspondence with the axial movement of that carriage. Projector 631 directs a beam of light through transparent drum 46 so as to illuminate mask 630 by a scanning spot. The light from that spot is modulated in intensity by the tone then scanned on the mask and is subsequently transmitted to a conventional mask scanner unit 640 which converts the received light into the masking signal appearing on the lead 622. Such masking signal is characterized by a high level and a low level when derived from the scanning of, respectively, a transparent tone and an opaque tone on the mask 630. As earlier described, a high-level masking signal (produced when scanning a type or a type-and-background area on original 60) operates through lead 622 to close gates 621 and 631 to thereby connect contacts 603 and 613 to, respectively, the "-type" taps 615 and 625. In contrast, a low-level masking signal (produced when a picture or other graduated tone area on original 60 is being scanned) operates through lead 622 to close gates 620 and 630 to thereby connect contacts 603 and 613 to, respectively, the "picture" tap 614 and the "picture" tap 624**.

So far, consideration has been given only to the left-hand tone scale selector unit 569 and the control exerted thereby on the left range and level control unit 158. The right range and level control unit 158' is, however, controlled in the same way by the right-hand tone scale selector unit 569'. The latter unit is, as stated, a duplicate of unit 569 so as to be selectively actuated in a corresponding manner by the movement of linkages 589, 595 and by the level of the masking signal on lead 622. Hence, any switch-controlled change in level and range which is made to the left half image signal by unit 158 is also made to the right half image signal by unit 158'.

The FIG. 43 system is operated in a manner as follows to accommodate different kinds of copy.

If original 60 consists only of a picture or a like graduated tone subject (as exemplified by the copy 500 of FIG. 37), then button 580 is pulled out to its "U" or "unmixed copy" position, and button 596 is likewise pulled out so as to yield the mode of reproduction designated as "P" (for "picture") when button 580 is at "U". That positioning of the two buttons connects tap 614 to the input of amplifier 570 and tap 624 to lead 623 to thereby cause the left half image signal (and also the right half image signal) to have the picture black level 193 and the tonal range 511 (FIG. 42). With the tone scale of the image signal being so adjusted, all of the tones on the scanned original copy are reproduced in half tone.

If original 60 consists only of uniform-tone black type matter on a uniform-tone white background (as exemplified by the copy 502 of FIG. 38) button 580 is maintained at "U" position, but button 596 is pushed in to yield the mode of reproduction designated as "T" (for "type") when button 580 is at "U". For such positioning of the two buttons, tap 615 is connected to the input of amplifier 570 and tap 625 is connected to lead 623 to cause the left half image signal (and, also the right half image signal) to have the "type" black level 515 and the "type" tone range 517 (FIG. 42). For that adjustment of the tone scale of the image signal, both the type matter and the background matter of the scanned original copy will be reproduced in full tone for the reasons earlier described in connection with FIG. 42.

If the scanned original copy consists of a mixture of one or more graduated tone areas and one or more areas of type only or of type-and-background, button 580 is pushed into its "M" (for "mixed copy") position, and the FIG. 43 system then offers the alternatives of reproducing the original either by the "I" (for "intermediate scale") mode or by the "A" (for "automatic") mode. If the "I" mode is desired, button 596 is positioned outward to connect tap 616 to the amplifier 570 and tap 626 to lead 623 to cause the left half image signal (and, also the right half image signal) to be characterized by an intermediate black level 523 and the intermediate tonal range 524 (FIG. 42).

As earlier described such "I" mode of reproduction is adapted to provide full-tone reproduction of type and halftone reproduction of graduated tones in instances where the black type is darker than the darkest one of the graduated tones. With such "I" mode, a light or white reproduced background for type will normally include pin-point halftone dots. If desired, however, the tap 626 (which controls the tone range of the image signal) may be adjusted on potentiometer winding 627 to cause reproduction in full tone of such background in instances where that background is lighter in tone than any of the graduated tones of the one or more picture areas on the copy being reproduced.

For the "A" mode of reproduction, button 596 is pushed into "A" position to cause the DC level supplied to amplifier 570 and the degree of shunting of winding 627 to be controlled by the masking signal on lead 622. The scanning of either a type or a type-and-background area on original 60 is accompanied by the scanning of a corresponding transparent area on mask 630 and a consequent masking signal of high level. As earlier described, the high-level masking signal opens gates 621 and 631 to couple taps 615 and 625 through the corresponding switching networks to, respectively, the leads 589 and 623 to provide for the left half image signal the type black level 515 and the type tone range 517 which are shown in FIG. 42. The same level and tone range are provided in the same circumstances for the right half image signal. Hence, each type or type-and-background area of original 60 will be reproduced in full tone.

On the other hand, the scanning of a graduated tone area on original 60 is accompanied by the scanning of an opaque area on mask 630 and a consequent masking signal of low level. The low level masking signal opens gates 620 and 630 to couple taps 614 and 624 through their corresponding switching networks to, respectively, the leads 589 and 623 so as to provide for the left-hand image signal the picture level 193 and the picture tone range 511 (FIG. 42). Simultaneously, a similar level and range is provided for the right half image signal. A scanned graduated tone area of original 60 is, therefore, reproduced in half tone.

As compared to the "I" mode, the "A" mode of reproduction is advantageous because it permits reproduction of type (or type-and-background) in full tone and of graduated tone in half tone irrespective of whether the type is or is not darker than the darkest graduated tone and irrespective of whether the background for the type is or is not lighter than the lightest graduated tone. The "I" mode of reproduction is, however, more convenient in instances where it is appropriate because such "I" mode does not require the use of a knockout mask and of switching circuits controlled by the signal derived from such mask.

The described tone scale selector units 569 and 569' provide a rapid and convenient way of controlling the tone scale of the image signal to permit selection as appropriate between full-tone and halftone reproduction of scanned copy areas. Those units 569 and 569' are not, however, wholly necessary to the "P", "T" and "I" modes of reproduction since any one of those three modes can be obtained (somewhat more laboriously) by the simple expedient of making the appropriate separate adjustments to the level and range controls of each of the units 158 and 158' of FIG. 8.

Turning now to other improvements shown by FIG. 43, in the modified system of that Figure, the left and right half image signals are supplied to, respectively, a modulator circuit 650 and a modulator circuit 650' as well as being supplied as before (FIG. 8) and by leads 648 and 648' to, respectively, the units 160, 161 and the units 160', 161' of the FIG. 8 system. The two half image signals are each converted by the corresponding modulator circuit into amplitude or frequency modulation on a carrier wave commonly supplied to the circuits 650 and 650' from an oscillator 651 or other carrier source. The left and right modulated carrier signals are then supplied by leads 652 and 652' to a local magnetic storage and retrieval unit.

As a further improvement, the black and white bar pattern extending (on photographic film strip 50) around drum 46 is modified to include (FIG. 44) a section 660 of black bars 661 and white bars 662 which are each half the width (in the circumferential direction around the drum) of the normal black bars 51 and white bars 52. The mentioned section 660 of half-width bars is angularly disposed on the drum to register with the gap 663 left between the axially extending opposite edges of the original copy 60 when that copy is wrapped around drum 46. The circumferential length of section 660 is approximately the same as that of scanning zone 53.

For purposes of detection of section 660, the mask 115 of FIG. 5 is replaced by a mask 670 (FIG. 45) characterized by different bar patterns 671 and 672 on the right- and left-hand sides of the mask. The right-hand bar pattern 671 is formed as before of alternate black bars 116 and white bars 117 which are each of a width equal to that of the image projected onto mask 670 of any one of the normal black bars 51 and white bars 52 on strip 50. The left-hand bar pattern 672 of mask 670 is, however, formed of alternate black bars 673 and white bars 674 which are each half the width characterizing each of bars 116, 117 and which are each equal in width to that of the image projected onto mask 670 of any one of the half-width bars 661 and 662 in section 660.

With mask 670 being comprised of such two-bar patterns, the scanning of strip 50 through mask 670 causes the scanner 56 (FIG. 43) to generate on lead 57 a signal which is characterized by the following features. So long as only the normal width bars 51 and 52 are passing through scanning zone 53, the total light through left pattern 672 remains constant, but the total light through right pattern 671 cyclically varies at a frequency $F_1$ to develop the earlier described graduating signal on lead 57. As, however, the section 660 of half-width bars moves into and then out of scanning zone 53, a constant amount of light is transmitted through the changing-size portion of pattern 671 over which the half-width bars of section 660 overlap with the full width bars of the mask pattern 671. During the passage, therefore, of section 660 through scanning zone 53, the amplitude per cycle of the $F_1$ signal diminishes to or towards zero and then rebounds to again reach normal amplitude as the lagging end of section 660 clears the scanning zone. On the other hand, during the same movement of section 660 through the scanning zone 53, the total light transmitted through mask pattern 672 undergoes a cyclical variation characterized by a frequency $F_2$ which is twice $F_1$ and by an amplitude per cycle which rises from zero to a peak and then falls back to zero as section 660 clears the scanning zone. One such $F_2$ signal burst with a triangular modulation envelope will be produced for each revolution of drum 46. The $F_2$ signal formed of a succession of such bursts is used for synchronizing purposes as later described.

As an alternative to the constructions just described of section 660 (FIG. 44) and mask 670 (FIG. 45), the section 660 may be formed of a pattern of alternate black and white bars each having a width one third of that of the bars 51 and 52. With section 660 being so formed, the shutter mask used is the mask 115 (FIG. 5). When the pattern of bars of one-third width passes through scanning zone 53 to have the image of that pattern projected onto mask 115, the result will be the generation of a burst of a cyclical signal which resembles the previously described $F_2$ signal by being characterized by a triangular variation in amplitude per cycle, but which differs from the $F_2$ signal by having a frequency for its cycles which is the third harmonic of the $F_1$ graduating signal. The advantages in so developing such third harmonic signal are: (a) the whole transverse width of strip 50 is used (in conjunction with the whole transverse width of mask 115) to generate both the $F_1$ signal and the burst of the third harmonic signal, and (b) each burst of the third harmonic signal includes a waveform component at the fundamental frequency $F_1$ to thereby assist in maintaining the continuity of the $F_1$ signal during the period of the burst. It is to be understood that (with appropriate modification to allow for the difference in frequency between the third harmonic and $F_2$ signals), the presently described system may be adapted to use (for synchronizing purposes) the mentioned third harmonic signal in place of the $F_2$ signal.

From the foregoing description, it will be evident that what appears on lead 57 is the $F_1$ signal on which is superposed intermittent bursts of the $F_2$ signal. Such combined signal on lead 57 is, for one thing, fed on lead 680 to a storage-retrieval unit later described and used for purposes of obtaining remote reproduction.

For local reproduction purposes, the $F_1$ and $F_2$ components of the combined signal are separated from each other and extracted from the combined signal by, respectively, a bandpass filter unit 681 tuned to frequency $F_1$ and a bandpass filter unit 682 tuned to frequency $F_2$. Unit 681 is a high Q-filter which removes from the $F_1$ signal most of the amplitude variation occurring during an $F_2$ signal burst, and which supplies the filtered $F_1$ signal to the graduating signal channel 148 (FIG. 8). Unit 682 filters out any $F_1$ component from the $F_2$ signal bursts and then supplies such bursts to a rectifier 683. The rectifier converts each such burst with its triangular modulation envelope into a DC pulse of triangular waveform. Each such pulse is, in turn, supplied to the linear carriage drive unit 66 (FIG. 2) to synchronize the step by step axial movement imparted by unit 66 to carriage 64 with the scanning of original 60 by scanner 62 so as to cause each such axial movement to take place when scanner 62 is viewing the described gap 663 between the axially extending opposite edges of the original.

Figure 46:
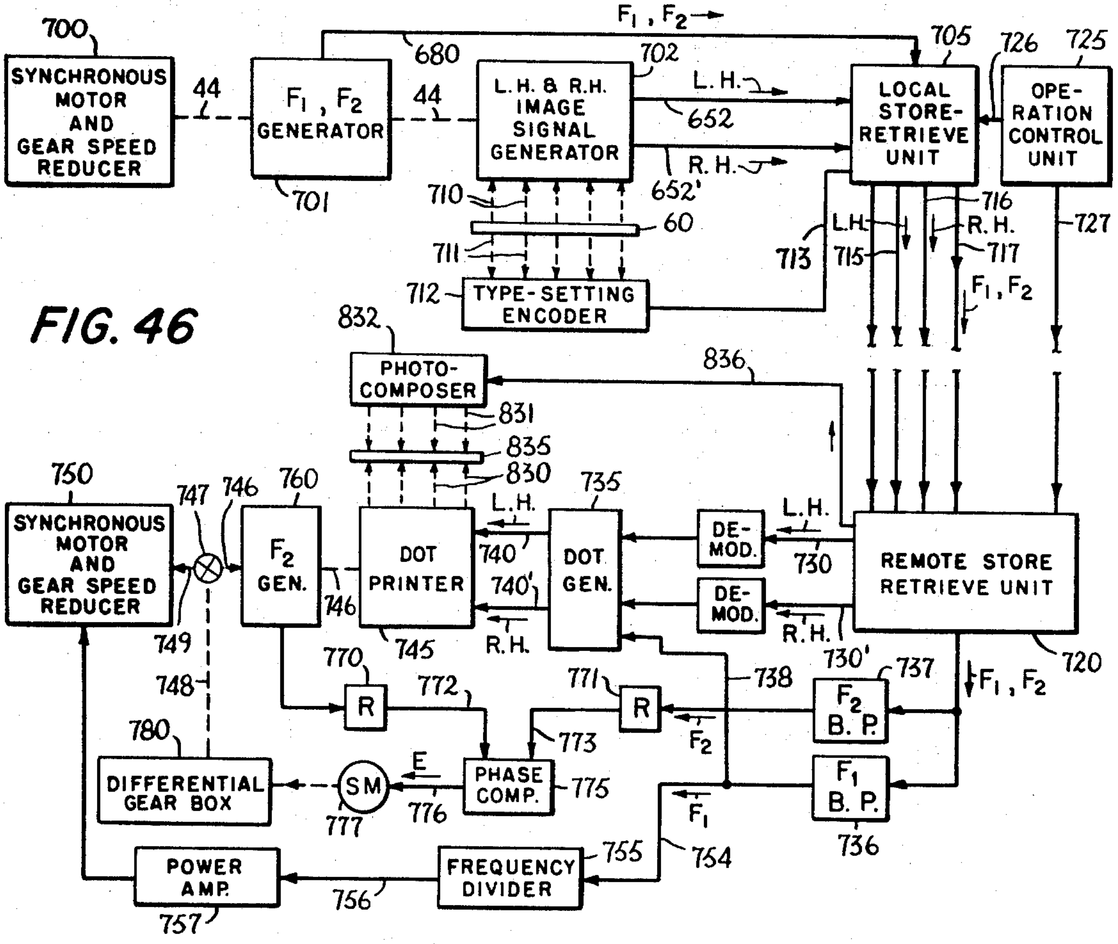
FIG. 46 is a block diagram of the FIG. 43 system as adapted for remote reproduction.

Moving on to FIG. 46, that Figure is a block diagram of the described system as modified in accordance with FIG. 43 and as incorporated in a larger overall system providing for reproduction of scanned originals at one or more remote locations. In FIG. 46, the reference numeral 700 designates a unit comprised of a synchronous motor (corresponding to the motor 41 of FIG. 2) together with a gear speed reducer interposed between the synchronous motor to produce the combined $F_1$, $F_2$ signal on lead 680 by apparatus 701 comprised of the bar scanner 56 and its associated elements (FIG. 43). Simultaneously, the driving of shaft 44 causes the production of the left and right half image signals on, respectively, the leads 652 and 652' by apparatus 702 comprehending the image scanner 62 and mask scanner 640 (FIG. 43), the area signal channel 149 (FIG. 8), the left half image signal channel 150 up to and through unit 158 (FIG. 8), the right half image signal channel up to and through unit 158' (FIG. 8) and modulator circuits 650 and 650' (FIG. 43). It will be recalled that, on the output leads 652 and 652' from those modulators, the left and right half image signals each appear in the form of modulation on a carrier wave.

Leads 652, 652' and 680 supply the signals which are respectively thereon to a local store and retrieve unit 705. That unit may be a conventional unit of such sort which is adapted to record received information on one or more magnetic tapes and to play back such information. During the scanning of original 60, unit 705 is operated to store the information provided by the left and right half image signals on leads 652, 652' and, also, the $F_1$, $F_2$ signal on lead 680 so as to enable reproduction at a later time of all or part of that original. The data thus stored is dot data enabling original 60 (or a part thereof) to be reproduced in full tone or in half tone or part in full tone or part in half tone as determined by the selector units 569 and 569' (FIG. 43).

In FIG. 46, the flow of information from original 60 to apparatus 702 is represented by the dotted line arrows 710. Where all of original 60 is to be reproduced by a point-to-point scanning of the sort so far described, all the information provided by the original 60 is imparted to apparatus 702 by the information flow 710.

On the other hand, where the original is comprised in part of type matter and in part of picture matter, it may be desired to reproduce the picture matter by scanning techniques but to reproduce the type matter by photocomposing. In that instance, the picture matter is converted into signal data by being imparted to apparatus 702 by the information flow 710, but the type matter is converted into coded data (e.g., teletype code) by way of an information flow which is represented by dotted line arrows 711, and which is from the original 60 to the operator of a typesetting encoder 712. Such an encoder may be a system similar to that described in U.S. Pat. No. 3,328,764 granted June 27, 1967 in the name of Sorenson et al. and adapted by appropriate keyboarding to derive from all or a part of a page of type matter a plurality of strings of data inclusive both of data signifying the text to be reproduced and the data corresponding to justification and other format instructions and signifying the desired format or appearance of the text to be reproduced. All such data produced by coder 712 may be supplied via cable 713 to the unit 705 to be stored in coded form in the latter unit.

The information stored by local unit 705 is adapted to be retrieved and then transmitted to another store-retrieval unit 720 of similar character to unit 705 and disposed at a location remote from the part of the system shown by the top half of FIG. 46. The transmission of information from unit 705 to unit 720 may, as shown, be accomplished via separate cables 715, 716 and 717 for, respectively, the left half image signal, the right half image signal and the $F_1$, $F_2$ signal and by another cable 718 for the coded data derived from coder 712. It is to be understood, however, that such transmission may also be effected in some mode other than by cables as, for example, transmission by way of a radio link between the two store-retrieve units.

Both of units 705 and 720 are controlled in their respective modes of operation by an operation control unit 725 coupled to unit 705 by cable 726 and to unit 720 by a cable or other link 727. Unit 725 provides commands to unit 705 which causes such unit to perform at selected times the separate operations of storing, retrieving and transmitting information and clearing itself of information. Also, unit 725 via cable 726 may supply a signal to the local unit 705 which commands that unit to bypass storage and to transmit without delay the information received thereby. The control unit is further adapted to transmit similar commands via link 727 to the remote unit 720 to similarly control the operation of that unit. When, however, the transmitted information is initially stored in unit 720, the command for retrieval of such information and the supplying thereof to the reproducing sections may originate at the remote location rather than at the unit 725.

If storage in both of units 705, 720 is bypassed, then the FIG. 46 system operates in real time. If, however, information storage and retrieval in one or both of units 705, 720 is operationally interposed between the scanning of original 60 and its reproduction, then the FIG. 46 operates in a delayed time manner.

Whether or not the transmitted information bypasses storage in unit 720 or is initially stored in and then retrieved from that unit, such information is supplied to the reproducing sections of the remote part of the system in a manner as follows.

The left and right half-image modulated carrier signals are fed on, respectively, the leads 730 and 730' to demodulator circuits 731 and 731' which demodulate such signals and then supply them to a dot generator apparatus 735 comprehending the graduating signal channel 148 of FIG. 8 and all of the components of channels 150, 150' of the FIG. 8 system which are shown in FIG. 8 as being to the right of the range and level control units 158 and 158'. The $F_1$, $F_2$ signal is separated into its $F_1$ and $F_2$ components by bandpass filters 736 and 737. The $F_1$ component (i.e., the graduating signal) is supplied from the output of filter 736 via lead 738 to the graduating signal channel 148 (FIG. 8) incorporated into apparatus 735. That apparatus serves in the manner earlier described to generate left and right ribbon deflection signals supplied on, respectively, the leads 740 and 740' to a dot printer apparatus 745 comprised of the drum 45 and the light valve control recording means 63 which are shown in FIG. 2.

A difference between the systems of FIGS. 2 and 46 is that in FIG. 46 the reproducing drum is not driven by the same motor as that driving the drum on which the original 60 is mounted. Instead, in FIG. 46, the reproducing drum is rotated by an output shaft 746 for a 1:1 mechanical differential 747 having a first input shaft 748 (used for a purpose later described) and a second input shaft 749 coupled to a drive unit 750.

Unit 750 is a duplicate of unit 700. That is, the unit 750 is comprised of a synchronous motor and a gear speed reducing mechanism similar to those of unit 700, the speed reducer of 750 being coupled between the shaft 749 and the motor of the drive unit 750.

Power for such motor is provided by supplying the $F_1$ signal from filter 736 via lead 754 to a frequency divider 755 which derives from the $F_1$ signal an alternating current output appearing on lead 756 and of the same frequency as the AC energy which powers the motor in local unit 700. That output from divider 755 is amplified by power amplifier 757 and is then supplied to unit 750 to energize the motor thereof. Because in the FIG. 46 system, the $F_1$ signal is used (in addition to its other functions) to cause the electric power for unit 750 to be at the same frequency as the electricity which powers unit 700, and because similar synchronous motors will run at the same speed when energized by power of the same frequency, the respective motors of units 700 and 750 run at the same speed. Hence, if the input shaft 748 for differential 747 remains stationary, the reproducing drum of dot printer 745 will be rotated by unit 750 at a speed synchronized with the rotation imparted by unit 700 and shaft 44 to the drum incorporated in image signal generator 702 and carrying the scanned original 60.

The drum for the reproduction is thus speed synchronized in real or delayed time with the drum for the original and, further, is synchronized in real or delayed time in a particular phase relation with the drum for the original. Upon starting up, however, the rotation of the reproducing drum, that drum may not lock in at the desired zero degree phase relation with the drum for the original. More specifically, while the shafts of the respective motors of units 700 and 750 will be in phase by virtue of being at the same angular position at the same instant in real time or delayed time (when such motors are two-pole motors), the use in those units of gear speed reducing mechanisms permits the shaft for the two drums to be out of phase by discrete angular increments even though the shafts for the two motors are in phase. For example, if such mechanisms provide a 4:1 speed reduction, then the shafts for the two drums may be out of phase by 90°, 180° or 270° even though the shafts for the two motors are in phase. Irrespective, moreover, of the effect of the speed-reducing mechanisms, the shafts for the two drum may lock into an out-of-phase relationship with each other when the synchronous driving motors for the drums have more than two poles. If, however, such an out-of-phase relation exists between the drum shafts, then the motion of the reproducing drum will not have the proper phase relation to the output signals from dot generator 735 to effect a reproduction of original 60 which is a point-to-point replica of that original.

The phase-synchronizing problem just stated is overcome in the FIG. 46 system by the use of a phase-synchronizing means of the following character.

Figure 44:
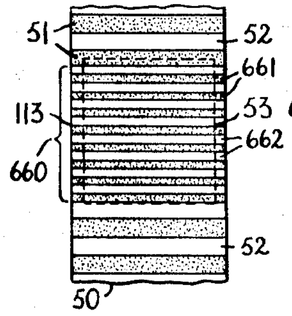
FIGS. 44 and 45 are developed enlarged schematic views of details of the FIG. 43 system.
Figure 45:
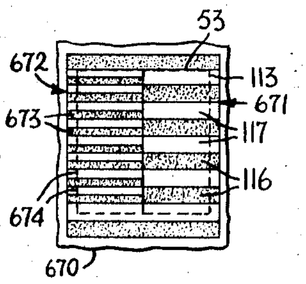

The shaft 746 for the reproducing drum also drives an $F_2$ signal apparatus 760 similar to that described in connection with FIGS. 43, 44 and 45 excepting that (1) the scanned bar pattern of apparatus 760 consists only of a single pattern segment of half-width bars similar to section 660 (FIG. 44), and (2) the shutter mask of apparatus 746 consists of a pattern of half-width bars differing from the bars 673, 674 of FIG. 45 by extending transversely across the entire shutter mask. Apparatus 760 hence does not generate any $F_1$ signal but does generate intermittent $F_2$ signal bursts similar to the previously described $F_2$ signal bursts derived from apparatus 701.

The scanned bar pattern and the shutter mask of apparatus 760 have the same relative space phasing in the circumferential direction around shaft 746 as the relative space phasing of section 660 and shutter mask 670 in the circumferential direction around shaft 44. Therefore, shaft 746 and the reproducing drum driven thereby will be in proper phase relation with the output signals from dot generator 735 when the $F_2$ signal bursts from apparatus 760 are in zero time phase relation with the $F_2$ signal bursts from the output of filter 737.

The $F_2$ signal bursts from generator 760 are phase compared and brought into zero phase relation with the $F_2$ signal bursts from filter 737 by rectifying both such signal bursts by rectifiers 770 and 771, respectively, and by then feeding the resulting rectified signals (in the form of triangular pulses) on leads 772 and 773 to a phase comparator circuit 775. Any difference in phase between the two inputs to that circuit is productive of an error signal E fed on lead 776 to a servomotor 777 to drive that servomotor.

The mechanical output of the servomotor 777 operates through a torque-amplifying gearbox 780 to rotate the input shaft 748 for differential 747 so as to impart to shaft 746 a movement in addition to the movement thereof produced by the rotation of shaft 749. Hence, shaft 746 is changed in phase relation to shaft 749 until the $F_2$ signal bursts from generator 760 are rendered in phase with the bursts from filter 737. At such point, the error signal E has been reduced to zero to terminate the driving of the servomotor, and the rotation of the scanned reproducing drum of dot printer 745 has been brought into proper phase relation with the left and right ribbon-deflecting signals fed to that dot printer. When that proper phase relation has so been attained, shaft 748 is kept stationary because the torque-amplifying gearbox 780 provides some frictional resistance to driving thereof in the forward direction (from motor 777 to shaft 748) and because a torque larger than the back torque exerted by differential 749 on shaft 748 would be necessary in order to overcome such friction so as to drive the gearbox in the reverse direction.

Figure 47:
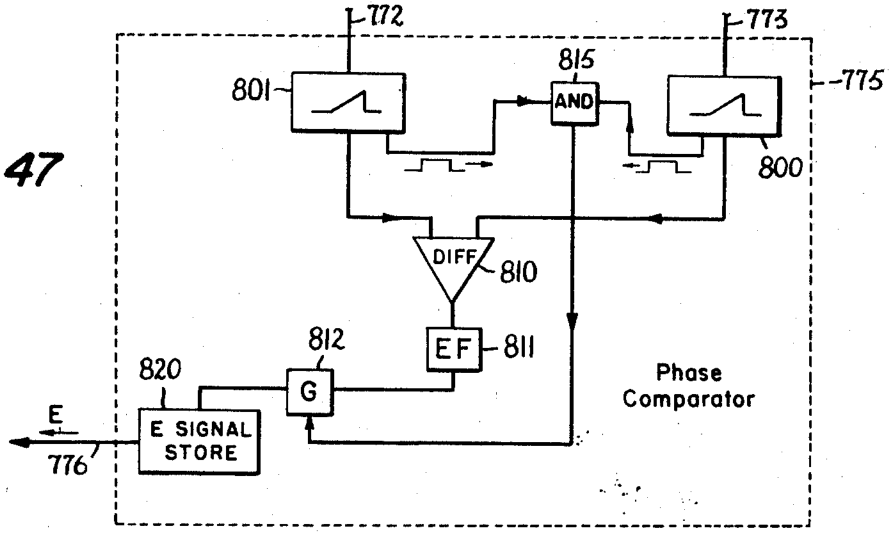
FIGS. 47 and 48 are, respectively, a schematic diagram and a waveform diagram for the phase comparator of FIG. 46.

FIG. 47 is a schematic diagram of the phase comparator circuit 775. In that circuit, the $F_2$ pulses on leads 773 and 772 are fed to respectively corresponding sawtooth generators 800 and 801 which are each triggered by each received pulse in the associated train of pulses to generate a sawtooth wave over a portion of each 360° rotation of the respective one of the shafts 44 and 746 from which was derived the triggering pulse for that wave. The sawtooth waves from the two generators have equal slopes but have unequal durations chosen so that, at each position at which shaft 46 may lock into a real or delayed time phase relation with shaft 44 which is other than in-phase relation (i.e., zero degree phase relation), the sawtooth wave from either of generators 800 and 801 will overlap in time with one and only one sawtooth wave from the other generator. For example, if, as stated, 4:1 gear speed reducers are used in units 700 and 750, the shaft 746 may improperly lock at 90°, 180° and 270° phase relations with shaft 44. In that instance, the generator 800 produces a repetitive wave 805 (shown in solid outline in FIG. 48) which may have a duration corresponding to rotation at normal speed of shaft 44 through 170°, whereas generator 801 produces a repetitive wave 806 (shown in dashed outline in FIG. 48) which may have a duration corresponding to rotation at the same speed of shaft 746 through 190°.

Figure 48:
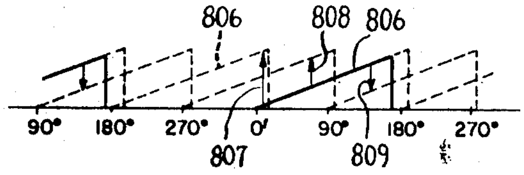

FIG. 48 shows that, with such duration values for the waves 805, 806 and considering wave 805 to be the reference wave, the difference in amplitude of wave 806 from wave 805 during the time of overlap of both waves is given by arrows 807, 808 and 809 when shaft 746 is displaced from shaft 44 by angular values of 180°, 270° and 90°, respectively. Also shown by FIG. 48 is that when shafts 44 and 746 are in zero degree phase relation, there is no difference in the instantaneous amplitude of waves 805 and 806 during the time of overlap of those two waves.

The sawtooth waves from generators 800 and 801 are each fed to a differential amplifier 810 of which the output is supplied through an emitter-follower 811 to a normally closed gate circuit 812. Also derived from each of the sawtooth generators is a square wave of the same duration as the sawtooth wave from that generator. The two square waves from the two generators are fed to an AND-circuit 815 which controls gate circuit 812 to open it only when the two square waves overlap in time. Hence, the output of the gate circuit is an intermittent signal of a polarity and amplitude represented by arrows 807, 808 and 809 for 180°, 270° and 90° phase displacements of shaft 746 from shaft 44. The intermittent signal is, of course, zero when the shafts 44 and 746 are in zero degree phase relation.

The intermittent signals from the output of the gate circuit 812 are fed to a storage device 820 which derives from each such signal an error signal E of the same polarity and amplitude as the intermittent signal but of a duration which is held until the device 820 is reset by the next received intermittent signal. As described, that error signal E is fed on lead 776 to servomotor 777 to cause the closed loop system formed of elements 777, 780, 747, 746, 760, 770 and 775 to act to reduce the error signal E to zero.

Returning to FIG. 46, the dashed line arrows 830 and 831 are representative of flows of information from, respectively, the dot printer 745 and a photocomposer 832 to a sheet of sensitized photographic film 835 on which the ordinary-type matter of the original is reproduced by flow 831 and the pictures on the original (or any other matter on the original which is unreproducable by a photocomposer) are reproduced by the flow 830. In order to expose information on the same sheet 835 by photocomposing and by the scanning techniques provided by dot printer 745, the scanning and photocomposing operation are preferably effected sequentially. This may be done by selective actuation of the remote store-retrieve unit 720 to, say, first retrieve and read out the coded data for controlling photocomposer 832 via lead 836, and to then retrieve and read out the described signals for controlling the dot printer 745.

In the course of reproducing on film sheet 835 by scanning, the dot printer is prevented from exposing any information on the areas of the sheet reserved for photocomposed matter by employing a mask scanner (FIG. 43) and an exposure control mask similar to those shown by FIGS. 39*a*–41*a*.

In the instance of the FIG. 46 system, the exposure control mask is coded in three ways as, for example, by having full transparent areas (corresponding to areas on sheet 835 for photocomposed matter), partially transparent areas (corresponding to areas on sheet 835 wherein type or type-plus-background is to be reproduced by scanning) and opaque areas (corresponding to areas on sheet 835 wherein pictures or other graduated tone subject matter are to be reproduced by scanning). Taken in the order named, those three types of mask areas produce a masking signal of very high level, high level and low level, respectively. The low and high levels of such masking signal control as before the tone scale of the left and right half image signals by the "A" or automatic mode of adjustment. The very high level of the masking signal causes, however, the closing of two gate circuits (not shown) which follow, respectively, the units 158 and 158' (FIG. 43) to completely block by their closures the flow of the half image signals from the units 158 and 158'. Hence, during the scanning of dot printer 745 over the areas of the film sheet 835 which are reserved for photocomposed material, the light valve of the dot printer will remain closed, and no formation information be exposed from the dot printer on such areas.

The photocomposer 832 may be of the type disclosed in U.S. Pat. No. 3,122,075 issued Feb. 25, 1964 to Battle H. Klyce, or unit 832 may be some other type of photocomposer well known to the art. As is conventional, the coded data controlling the photocomposer may include instructions which program the exposure of information by the photocomposer on the sheet 835 so as to avoid exposure of any such information on areas of the sheet reserved for reproduction of information by the scanning of the sheet by dot printer 745.

The above-described embodiments being exemplary only, it is to be understood that additions thereto, modification thereof and omissions therefrom can be made without departing from the spirit of the invention, and that the invention comprehends embodiments differing in form and/or detail from those which have been specifically disclosed. Accordingly, the invention is not considered as limited save as is consonant with the recitals of the following claims.

I claim:

1. In apparatus in which an original image is scanned to convert point-to-point values of said image in a scan track for said image into an electrical image signal representative of said values, and in which said image is reproduced by correspondingly scanning an image-receptive member and concurrently recording said values on said member in a scan track therefor, the improvement comprising, source means of a cyclical electrical scan track graduating signal of which the periods are representative of dot intervals along said scan track for said member, signal-combining means responsive to said electrical image and graduating signals to yield an electrical dot signal having a period and a magnitude per period which are functions of, respectively, the period of said graduating signal and the magnitude of said image signal, and recording means controlled by said dot signal to record dots in said scan track intervals on said member so as to reproduce said image by said dots, in which said recording means is variable width recording means controlled by the magnitude per period of said dot signal to vary the width transverse to the scanning direction of the recording made by such means in the scan track for said member so as to form dots of variable width on said member and shift the centers of area of said dots in a direction transverse to the direction of scanning, and in which the magnitude per period of said dot signal undergoes a variation per period from a relatively low to a relatively high value and then back to a relatively low value, and in which said variable width recording means responds to said variation in magnitude per period of said signal to form the corresponding recorded dot by subsequently decreasing the width thereof.

2. The improvement as in claim 1 in which said recording means is nonresponsive to magnitude values attained by said dot signal and exceeding a predetermined level so as to render of constant width the central portion in the direction of scan of dots formed by said recording means when said dot signal attains such values.

3. The improvement as in claim 1 in which said variation in magnitude per period of said dot signal is a function of a magnitude component superposed on another magnitude component sustained by said dot signal for a plurality of periods, and said recording means responds to such signal when characterized by both said components to form on said member and in the scan track therefor a plurality of dots which correspond to said periods and are connected together in such scan track by necks of finite width.

4. The improvement as in claim 1 in which the variation in magnitude per period of said dot signal is in the form of a sawtooth variation.

5. The improvement as in claim 4 in which the variable size dots which are formed by said recording means in response to said dot signal are dots of diamond shape.

6. The improvement as in claim 1 in which said variation in magnitude per period of said dot signal is a function of a magnitude component superposed on another magnitude component sustained by said dot signal for a plurality of periods, said recording means is nonresponsive to magnitude values attained by such dot signal and exceeding a predetermined level, and said recording means is controlled by said dot signal when having both said components and when attaining magnitude values exceeding said level to form on said member and in the scan track therefor a plurality of octagonally shaped dots which correspond to said periods and are connected together in such scan track by necks of finite width.

7. The improvement as in claim 1 in which said image-receptive member is a photosensitive sheet and said variable width recording means is comprised of a dual ribbon light valve of which the two ribbons are controlled by said image signal to deflect away from each other as a function of said signal so as to form a variable width gap therebetween, said recording means being further comprised of optical means including light source means to expose said dots on said gap by an exposing beam of light which is modulated in width by the deflection of said ribbons.

8. In apparatus in which an original image is scanned to convert point-to-point values of said image in a scan track for said image into an electrical image signal representative of said values, and in which said image is reproduced by correspondingly scanning an image-receptive member and concurrently recording said values on said member in a scan track therefor, the improvement comprising, source means of a cyclical electrical scan track-graduating signal of which the periods are representative of dot intervals along said scan track for said member, signal-combining means responsive to said electrical image and graduating signals to yield an electrical dot signal having a period and a magnitude per period which are functions of, respectively, the period of said graduating signal and the magnitude of said image signal, and recording means controlled by said dot signal to record dots in said scan track intervals on said member so as to reproduce said image by said dots and (The improvement as in claim 1) in which the scan track for said original image is divided into left and right hand strips on opposite sides of a centerline for said track, and in which said image signal is provided by dual scanning means which separately scans said two strips to derive left and right half-image signals from said left- and right-hand strips, respectively.

9. The improvement as in claim 8 in which said original image is provided by a tonal subject, and in which said dual scanning means is comprised of means to relatively move said subject through a scanning zone, aperture means having a slit therein, optical means including light source means to project to said aperture means a light image of the portion of said subject instantaneously in said zone, the slit of said aperture means passing light from said projected image which is derived from a slit spot on said subject of the width of the scan track for said subject, and said slit spot being caused by said relative motion to travel over said subject in a direction normal to the width of said spot to thereby trace out said track, optical beam-splitter means to split the light passing through such slit into first and second beams comprised, respectively, of light derived from the half of said spot which is leftward of said centerline of said track and the half of said spot which is rightward of said centerline, and first and second photoresponsive means disposed to receive, respectively, said first and second beams and to convert the light in, respectively, said first and second beams into, respectively, said left and right half-image signals.

10. The improvement as in claim 8 further comprising comparator means responsive to said left and right half-image signals to sense by a comparison of such signals a difference in value occuring between those signals and representative of a scanned gradient between contrasting areas of said original image, said recording means in the presence of such a scanned gradient being controlled by said comparator means as a function of said difference to modify the dots being recorded on said member to reproduce said scanned gradient by said dots so as to smoothen the reproduced gradient.

11. The improvement as in claim 10 in which said recording means is controlled in the presence of said scanned gradient as a function of the difference between said left and right half image signals to shift the centers of area of the dots then being recorded on said member away from the location said centers would have in the absence of scanning of a gradient.

12. In apparatus in which an original image is scanned to convert point-to-point values of said image in a scan track for said image into an electrical image signal representative of said values, and in which said image is reproduced by correspondingly scanning an image-receptive member and concurrently recording said values on said member in a scan track therefor, the improvement comprising, source means of a cyclical electrical scan track graduating signal of which the periods are representative of dot intervals along said scan track for said member, signal-combining means responsive to said electrical image and graduating signals to yield an electrical dot signal having a period and a magnitude per period which are functions of, respectively, the period of said graduating signal and the magnitude of said image signal, synchronizing means correlating the scanning action of said original image and the signal generating action of said source means of said cyclical signal so as to synchronize the periods of (such) said cyclical signal with said scanning action, and recording means controlled by said dot signal to record dots in said scan track intervals on said member so as to reproduce said image by said dots and shift the centers of area of said dots in a direction transverse to the direction of scanning, and in which said original image is provided by a tonal subject carried by support means which relatively moves said subject through a first scanning zone to provide for optical scanning of the portion of said subject in said zone, and in which said source means of said cyclical signal comprises a pattern of alternating lighter and darker indicia relatively moved in the direction of alternation through a second scanning zone in synchronism with the relative motion of said subject through said first zone, said source means further comprising electrooptical means including photoelectric means responsive to the passage of said indicia through said second zone to generate said cyclical signal.

13. In apparatus in which an original image is scanned to convert point-to-point values of said image in a scan track for said image into an electrical image signal representative of said values, and in which said image is reproduced by correspondingly scanning an image-receptive member and concurrently recording said values on said member in a scan track therefor, the improvement comprising, source means of a cyclical electrical scan track graduating signal of which the periods are representative of dot intervals along said scan track for said member, signal-combining means responsive to said electrical image and graduating signals to yield an electrical dot signal having a period and a magnitude per period which are functions of, respectively, the period of said graduating signal and the magnitude of said image signal, and recording means controlled by said dot signal to record dots in said scan track intervals on said member so as to reproduce said image by said dots, and in which said signal-combining means comprises signal-comparator means responsive to said image signal and to said cyclical signal to provide zero output when the difference between said signals is of one polarity and to provide said dot signal with a magnitude per period functionally related to the magnitude of the difference between said image and cyclical signals when such difference is of the opposite polarity.

14. The improvement as in claim 1 further comprising, means to derive by double differentiation of said image signal and inversion of the resulting double differential signal an accentuating signal produced in the presence of a gradient in said image between contrasting areas thereof, and means to combine said accentuating signal with said image signal to effect accentuation of the gradient which is formed on said member as a reproduction of said original gradient.

15. The improvement as in claim 1 further comprising, means to scan an area of said image centered about the part of said image then being scanned in said scan track for said image, said area being at least ten times greater in side-to-side dimension than the width of said track, means to derive from the scanning of said area an area signal representative of the integral of detail characterizing said image within said area, and means to combine said area signal with said image signal so as to improve local contrast in the reproduction of said image on said member.

16. In apparatus in which an original image is scanned by a scanning spot to convert variations of said image into an image signal representative of said variations, and in which said image is reproduced by correspondingly scanning an image-receptive member and recording said variations on said member, the improvement comprising means responsive to at least said image signal to record said variations on said member in the form of dots representative of the total area scanned by the scanning spot to form respective dots, and means responsive to the presence of a scanned gradient between contrasting portions of the area scanned by the scanning spot (areas) in said original image during formation of each respective dot to modify the forming of the dots on said member at least in a direction transverse to the direction of scanning so as to sharpen said gradient as reproduced on said member by said dots.

17. In apparatus in which an original image having various tone values is scanned by a scanning spot which traces out a scan track of the width of said spot, the improvement comprising, first sensing means to derive from a portion of said spot which is leftward of the centerline of said track a first signal representative of values characterizing said image within said leftward portion of said spot, second sensing means to derive from a portion of said spot which is rightward of said centerline a second signal representative of values characterizing said image within said rightward portion of said spot, and means responsive to at least said first and second signals for reproducing tone values of (to reproduce) said image which are a function of at least said two signals.

18. The improvement as in claim 17 in which said image is provided by a tonal subject, said improvement comprising, optical scanning means to project a light image of tonal values characterizing said subject within said spot, optical beam-splitter means to split the light constituting said light image into a first beam provided by light derived from said leftward portion of said spot and into a second beam provided by light derived from said rightward portion of said spot, and first and second photoelectric means responsive to, respectively, said first beam and said second beam to generate, respectively, said first and second signals.

19. The improvement as in claim 17 in which said reproducing means comprises means responsive to at least said first and second signals to scan an image-receptive member and to record in a scan track therefor so as to reproduce said original image on said member, said improvement further comprising signal-comparator means responsive to said first and second signals to control said recording means as a function of a difference sensed between such signals so as to shift the record on said member in a direction transverse to the direction of scanning of said member.

20. The improvement as in claim 17 in which said reproducing means comprises variable width recording means for recording in a scan track on an image-receptive member so as to reproduce said image on said member, said track being divided by a centerline into left-hand and right-hand strips, and said recording means including first and second width control means responsive to, respectively, said left half-image signal and said right half-image signal to vary the width of recording on said member in, respectively, said left-hand strip and said right-hand strip of said track.

21. The improvement as in claim 20 in which said recording means is a dual ribbon light valve, and said first and second width control means are respectively provided by one and the other of the two ribbons of said valve.

22. In apparatus in which an original image is scanned to convert variations of said image into an image signal of variable magnitude representative of said variations for reproduction of the original image on an image receptive medium, the improvement comprising, source means of an electrical signal having a cyclically varying magnitude for establishing predetermined zones for sensing the image variations to be reproduced, means responsive to said image signal and cyclical signal to derive therefrom a resultant electrical signal which is of zero value when the difference between said magnitudes is of one polarity, said resultant signal having a value functionally related to the difference between such magnitudes when said difference is of the opposite polarity, and means responsive to said resultant signal to reproduce said image in the form of single dots of variable dimension within receptive zones.

23. In apparatus in which a scanned original is reproduced by correspondingly scanning an image-receptive member by a scanning spot and concurrently recording dots thereon in accordance with the scanned values of said original representative of the areas scanned by the scanning spot to form representative dots, the improvement comprising, sensing means (selectively) responsive to the presence of a gradient characterizing scanned values of contrasting portions of the area scanned by the scanning spot on said original during formation of a respective dot, and dot formation control means actuated by the (selective) response of said sensing means to control the recording of said dots on said member so as to reproduce said gradient by dots which are modified in a spatial parameter thereof relative to dots recorded on said member in the absence of such a gradient.

24. The improvement as in claim 23 in which said dots which reproduce said gradient are modified in respect to the centers of area thereof, said centers of area being shifted in accordance with the direction of said gradient relative to the centers of area of dots produced in the absence of such a gradient.

25. The improvement as in claim 24 in which said dots which reproduce said gradient are modified in respect to the parameter of shape, said modified dots being elongated in shape in the direction of said gradient relative to dots produced in the absence of such a gradient.

26. In apparatus in which a scanned original is reproduced by correspondingly scanning an image-receptive member by a scanning spot and concurrently recording dots thereon which vary in accordance with the scanned values of said original representative of the areas scanned by the scanning spot to form respective dots to reproduce said values and which have respective centers of area disposed in characteristic patterns for such centers when said dots are produced in response to scannings of expanses of said original which are of uniform value within each expanse, the improvement comprising, sensing means (selectively responsive to the presence of a gradient characterizing changes in the scanned values of contrasting portions of the area scanned by the scanning spot on said original during formation of a respective dot, and dot formation control means actuated by the selective response of said sensing means to such gradient to control the recording of dots on said member so as to reproduce said gradient by dots of which the centers of area are shifted in accordance with the direction of said gradient away from the center of area locations provided by said patterns.

27. The improvement as in claim 26 in which the shift of the centers of area of said modified dots is comprised of a component of displacement transverse to the direction of scanning of said member.

28. In apparatus in which a scanned original image is reproduced by correspondingly scanning an image-receptive member and concurrently recording values thereon in accordance with the scanned values of said original, the improvement comprising, means to scan said original by a first slit spot having a width disposed transverse to the scanning direction and greater than the dimension of said spot in the scanning direction, means to correspondingly scan over and to record values on said member by a second slit spot having a full size width disposed transverse to the scanning direction and greater than the dimension of said second spot in the scanning direction, and means to reproduce as dots on said member the values of said original scanned by said first spot by modulating during the production of each dot the transverse width of said second spot as a function of (such) said original values over a range of width extending between said full size transverse width and a lower limit for the transverse width of said second spot.

29. In a system in which an original image is scanned point-to-point in a first scanning pattern and is reproduced by scanning point-to-point a record-receptive medium in a second corresponding scanning pattern and concurrently recording on said medium the information detected by such scanning of said image so as to form on said medium a plurality of record portions each informationally corresponding with a respective one of a plurality of scanned portions on said image, and in which informationally corresponding image and record portions are normally in positional correlation by having respective centers of area at the same positions within, respectively, said first pattern and said second pattern in relation to the respective frames of positional reference provided for said image and record portions by, respectively, said first and second patterns, the improvement comprising scan-adjusting means responsive to a change in condition associated with the scanning of said image to modify the scanning of said record means by shifting the centers of area of recorded portions on said record medium away from said normal positional correlation of those centers with the centers of area of the informationally corresponding image portions at least in a direction transverse to the direction of scanning.

30. A system as in claim 29 in which each of said scanning patterns is a raster pattern comprised of a succession of scan lines, and in which the shifting effected by said adjusting means is transverse to the direction of scanning of said second pattern.

31. A system as in claim 29 in which said original image is a tonal image and said adjusting means is responsive to a tone density edge scanned on said image to effect such shifting.

32. A system as in claim 31 in which said material is scanned in a raster pattern comprised of a succession of scan lines, and in which said shifting is transverse to the direction of scanning said lines and serves to sharpen said edge as reproduced on said record means.

33. In a system in which a tonal original is scanned in a raster pattern by a first light beam and is reproduced by correspondingly scanning image-receptive means in a raster pattern by a second light beam and concurrently modulating the intensity of such beam in accordance with scanned tonal values of said original, the improvement comprising, edge-sensing means responsive to a scanned tone density edge on said original having at least a directional component parallel to the scan lines of the raster pattern for said original to generate an indication of said edge, and beam-shifting means responsive to said indication to shift the center of said second beam transverse to the direction of the scan lines of the raster pattern for said image-receptive means and away from the normal scanning position for such center so as to sharpen such edge as reproduced on said image-receptive means.

34. A system as in claim 33 in which said first beam forms a spot of light by which said original is scanned, said sensing means comprises means to derive first and second signals from scannings of said original which are respectively leftward and rightward of the center of said spot, said leftward and rightward scannings being continuous during each scanning in a line over said original, and said beam shifting means comprises means responsive to said first and second signals to shift as described said center of said second beam.

35. A method of reproducing type appearing on a contrasting background on copy comprising, scanning said copy point-to-point by a first light beam and deriving from such scanning at least one signal of the tonal information provided by said type and background, correspondingly scanning a light-sensitive medium point-to-point by at least one second light beam and concurrently controlling the intensity of said second light beam by said signal to expose an image of said type and background on said material, analyzing light obtained from scanning of said copy to derive therefrom an indication of a crossing by said first beam of a tonal edge formed by said type and contrasting background, and controlling said second beam by said indication to shift the center of such beam transverse to the scanning direction of said beam over said material and away from the normal scanning position of such center so as to sharpen such edge as reproduced on said material.

36. In a system in which tone values of an original image are scanned point-to-point by a light spot and are reproduced by correspondingly scanning an image receptive medium by means which concurrently records tone values on said medium in accordance with said scanned tone values of said original, the improvement comprising, first and second photoresponsive means to convert light derived from scannings of said original leftward and rightward of, respectively, the center of said spot into first and second signals corresponding to, respectively said leftward and rightward scannings, and means rendering said recording means conjointly responsive to said first and second signals throughout the reproduction of said original image on said medium so as to record tone values which are a function of said two signals.

* * * * *

UNITED STATES PATENT AND TRADEMARK OFFICE
CERTIFICATE OF CORRECTION

PATENT NO. : 3,646,262

DATED : February 29, 1972

INVENTOR(S) : William West Moe

It is certified that error appears in the above-identified patent and that said Letters Patent are hereby corrected as shown below:

Column 8, line 24,
"severly" should be --severely--;

Column 10, line 62,
"wholly in" should be --wholly by--;

Column 13, line 19,
"259 for" should be --259 of--;

Column 15, line 20,
"brightness" should be --brightnesses--;

Column 15, line 71,
"139 138'" should be --139'--;

Column 17, line 43,
"collector 314" should be --collector of 314--;

Column 20, line 13,
"$V_1$ to 0" should be --$V_1$ at 0--;

Column 23, line 4,
"280" should be --380--;

Column 24, line 1,
"389" should be --289--;

Column 24, line 11,
"not" should be --no--;

Column 25, line 12,
"(or other source" should be --(or other source)--;

UNITED STATES PATENT OFFICE
CERTIFICATE OF CORRECTION

Patent No. 3,646,262 Dated February 29, 1972

Inventor(s) William West Moe Page 2

It is certified that error appears in the above-identified patent and that said Letters Patent are hereby corrected as shown below:

Column 40, line 9, delete "formation"

Column 40, line 10, "information be" should be -- information will be --.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,646,262 Dated February 29, 1972

Inventor(s) William West Moe

It is certified that error appears in the above-identified patent and that said Letters Patent are hereby corrected as shown below:

Column 8, line 24, "severly" should read -- severely --.

Column 41, line 47, delete "(The improvement as in claim 1)".

Column 42, line 34, delete "(such)".

Column 43, line 30, delete "(areas)".

Column 43, line 46, delete "(to reproduce)".

Column 44, line 31, delete "(selectively)".

Column 44, line 35, delete "(selective)".

Column 44, line 62, delete "(selectively".

Column 45, line 15, delete "(such)".

Signed and Sealed this

Tenth Day of August 1976

[SEAL]

*Attest:*

RUTH C. MASON
*Attesting Officer*

C. MARSHALL DANN
*Commissioner of Patents and Trademarks*